United States Patent
Deng et al.

(10) Patent No.: US 11,137,258 B2
(45) Date of Patent: Oct. 5, 2021

(54) SYSTEMS AND METHODS FOR COMPREHENSIVE ROUTING

(71) Applicant: ServiceNow, Inc., Santa Clara, CA (US)

(72) Inventors: Xianfa Deng, Palo Alto, CA (US); Audrey Yachun Chen, Cupertino, CA (US); Devinder Narang, Palo Alto, CA (US); Wenhua Li, Palo Alto, CA (US); Venkitesh Subramanian, Fremont, CA (US)

(73) Assignee: ServiceNow, Inc., Santa Clara, CA (US)

( * ) Notice: Subject to any disclaimer, the term of this patent is extended or adjusted under 35 U.S.C. 154(b) by 383 days.

(21) Appl. No.: 16/241,723

(22) Filed: Jan. 7, 2019

(65) Prior Publication Data
US 2020/0217672 A1   Jul. 9, 2020

(51) Int. Cl.
*G01C 21/34*   (2006.01)
*G06Q 10/06*   (2012.01)
*G06Q 10/04*   (2012.01)

(52) U.S. Cl.
CPC ....... *G01C 21/343* (2013.01); *G01C 21/3446* (2013.01); *G06Q 10/047* (2013.01); *G06Q 10/06316* (2013.01)

(58) Field of Classification Search
CPC .............. G01C 21/343; G01C 21/3446; G06Q 10/06316; G06Q 10/047
See application file for complete search history.

(56) References Cited

U.S. PATENT DOCUMENTS

| | | | |
|---|---|---|---|
| 5,938,720 A | * | 8/1999 | Tamai ................ G01C 21/3446 701/533 |
| 6,609,122 B1 | | 8/2003 | Ensor |
| 6,678,887 B1 | | 1/2004 | Hallman |
| 6,816,898 B1 | | 11/2004 | Scarpelli |
| 7,020,706 B2 | | 3/2006 | Cates |

(Continued)

OTHER PUBLICATIONS

Baker, Edward K. "An Exact Algorithm for the Time-Constrained Traveling Salesman Problem." Operations Research, vol. 31, No. 5, 1983, pp. 938-945. JSTOR, www.jstor.org/stable/170895. Accessed Mar. 22, 2021 (Year: 1983).*

(Continued)

*Primary Examiner* — James J Lee
*Assistant Examiner* — Shon G Foley
(74) *Attorney, Agent, or Firm* — Fletcher Yoder PC

(57) ABSTRACT

In accordance with the present approach, a routing algorithm may be implemented to enable an agent to receive an acceptable route between a number of assigned tasks on demand. Particularly, the algorithm may determine the acceptable route by determining a travel cost for each route between an end location and one of the assigned tasks. Then, the algorithm may add in another assigned task and determine a travel cost for each route from the end location, to a first assigned task, and then to a second assigned task. Continuing in this manner, the algorithm constructs routes from the end location and through each possible subset of the assigned tasks, while tracking a permutation of each subset having the lowest travel cost. The algorithm may therefore trace back through the lowest-cost permutations to construct a complete route that has the lowest cost.

20 Claims, 12 Drawing Sheets

(56) References Cited

U.S. PATENT DOCUMENTS

| | | |
|---|---|---|
| 7,028,301 B2 | 4/2006 | Ding |
| 7,062,683 B2 | 6/2006 | Warpenburg |
| 7,131,037 B1 | 10/2006 | LeFaive |
| 7,170,864 B2 | 1/2007 | Matharu |
| 7,350,209 B2 | 3/2008 | Shum |
| 7,610,512 B2 | 10/2009 | Gerber |
| 7,617,073 B2 | 11/2009 | Trinon |
| 7,689,628 B2 | 3/2010 | Garg |
| 7,716,353 B2 | 5/2010 | Golovinsky |
| 7,769,718 B2 | 8/2010 | Murley |
| 7,783,744 B2 | 8/2010 | Garg |
| 7,890,802 B2 | 2/2011 | Gerber |
| 7,925,981 B2 | 4/2011 | Pourheidari |
| 7,930,396 B2 | 4/2011 | Trinon |
| 7,945,860 B2 | 5/2011 | Vambenepe |
| 7,966,398 B2 | 6/2011 | Wiles |
| 8,051,164 B2 | 11/2011 | Peuter |
| 8,224,683 B2 | 7/2012 | Manos |
| 8,266,096 B2 | 9/2012 | Navarrete |
| 8,402,127 B2 | 3/2013 | Solin |
| 8,457,928 B2 | 6/2013 | Dang |
| 8,478,569 B2 | 7/2013 | Scarpelli |
| 8,612,408 B2 | 12/2013 | Trinon |
| 8,674,992 B2 | 3/2014 | Poston |
| 8,689,241 B2 | 4/2014 | Naik |
| 8,743,121 B2 | 6/2014 | De Peuter |
| 8,832,652 B2 | 9/2014 | Mueller |
| 8,887,133 B2 | 11/2014 | Behnia |
| 8,983,982 B2 | 3/2015 | Rangarajan |
| 9,065,783 B2 | 6/2015 | Ding |
| 9,098,322 B2 | 8/2015 | Apte |
| 9,122,552 B2 | 9/2015 | Whitney |
| 9,239,857 B2 | 1/2016 | Trinon |
| 9,317,327 B2 | 4/2016 | Apte |
| 9,363,252 B2 | 6/2016 | Mueller |
| 9,508,051 B2 | 11/2016 | Falk |
| 9,535,674 B2 | 1/2017 | Cooper |
| 9,535,737 B2 | 1/2017 | Joy |
| 9,557,969 B2 | 1/2017 | Sharma |
| 9,645,833 B2 | 5/2017 | Mueller |
| 9,654,473 B2 | 5/2017 | Miller |
| 9,766,935 B2 | 9/2017 | Kelkar |
| 9,792,387 B2 | 10/2017 | George |
| 9,805,322 B2 | 10/2017 | Kelkar |
| 9,819,729 B2 | 11/2017 | Moon |
| 9,911,087 B1 | 3/2018 | Henderson et al. |
| 2013/0339266 A1* | 12/2013 | Looman .............. G06Q 10/08 705/338 |
| 2017/0301053 A1* | 10/2017 | Anai .............. G06Q 10/06315 |
| 2018/0005530 A1* | 1/2018 | Jeong .................. G08G 5/065 |
| 2018/0188065 A1* | 7/2018 | Brooks ................ G01C 21/20 |
| 2019/0017840 A1* | 1/2019 | Okamoto ........ G08G 1/096855 |
| 2019/0020578 A1* | 1/2019 | Beckmann ............. H04L 45/42 |
| 2021/0063181 A1* | 3/2021 | Saleh ................ G01C 21/3469 |

OTHER PUBLICATIONS

Howden, William The Planning Approach to Interactive Problem Solving and the Travelling Salesman problem Technical Report #20, 1972, {Retrieved [ONLINE] Mar. 13, 2021 (Year: 1972).*

* cited by examiner

SYSTEMS AND METHODS FOR COMPREHENSIVE ROUTING

BACKGROUND

The present disclosure relates generally to route optimization.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Organizations, regardless of size, rely upon access to information technology (IT) and data and services for their continued operation and success. A respective organization's IT infrastructure may have associated hardware resources (e.g. computing devices, load balancers, firewalls, switches, etc.) and software resources (e.g. productivity software, database applications, custom applications, and so forth). Over time, more and more organizations have turned to cloud computing approaches to supplement or enhance their IT infrastructure solutions.

Cloud computing relates to the sharing of computing resources that are generally accessed via the Internet. In particular, a cloud computing infrastructure allows users, such as individuals and/or enterprises, to access a shared pool of computing resources, such as servers, storage devices, networks, applications, and/or other computing based services. By doing so, users are able to access computing resources on demand that are located at remote locations, which resources may be used to perform a variety of computing functions (e.g., storing and/or processing large quantities of computing data). For enterprise and other organization users, cloud computing provides flexibility in accessing cloud computing resources without accruing large up-front costs, such as purchasing expensive network equipment or investing large amounts of time in establishing a private network infrastructure. Instead, by utilizing cloud computing resources, users are able redirect their resources to focus on their enterprise's core functions.

Certain enterprises' core functions relate to dispatching agents to service locations so that the agents can provide services and complete tasks for customers. For example, an agent may be assigned particular tasks through the one or more cloud computing resources and travel along a route between service locations to complete his or her assigned tasks. However, as in other contexts where tasks are assigned, the route taken by agent may be inefficient and result in excessive travel time or travel distance for the agent.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

After a set of tasks are assigned to an agent (e.g., field service agent, technician), the agent may inefficiently travel between service locations associated with the tasks due to a lack of comprehensive route planning. For example, the agent may complete his or her assigned workflow of tasks by traveling from each task to a next-closest task, causing unnecessary cross-overs or double-backs along a route during the course of the agent's workday. These practices may cause unnecessary travel times and travel distances for the agent, which lead to increased resource expenditure and costs for an enterprise directing the agent.

Accordingly, the present embodiments are directed toward a routing algorithm for generating a suitable ordering of geographically-separated tasks to be completed by an agent or other traveling personnel of a client. In contrast to current routing algorithms that may only consider or minimize travel time between two tasks, the presently disclosed algorithm considers each task assigned to the agent over a longer interval, such as for an entire workday. That is, the tasks and their respective service locations are considered in the aggregate or comprehensively to enable minimization of a travel cost (e.g., the travel time, travel distance) for a complete route between the tasks, as opposed to simply selecting the next closest task. To identify a route having the lowest or most suitable travel costs for a given set of conditions, the algorithm may determine the travel cost for each permutation of various subsets of the tasks, while tracking the permutation of each subset having the lowest travel cost. Then, the algorithm may trace back through the identified subsets to determine the lowest cost route from the identified lowest cost subsets. In some situations in which a number of tasks is greater than a threshold number of tasks (e.g., set based on computational limitations and/or service-level agreement), the algorithm may alternatively employ an approximation that conserves processing resources by generating a suitable approximate route.

The algorithm may also provide a route that prioritizes performance of certain tasks before other tasks and/or that enables the agent to arrive at certain tasks within specified time windows. For embodiments with specified time windows, the algorithm may conserve processing resources by first performing a simplified set of calculations to determine whether any time constraints are violated by a proposed route, and providing the proposed route to the agent if it meets the time constraints. If time constraints are violated by the proposed route, the algorithm may proceed to more in-depth, time-conscious determinations that provide a suitable whole or partial route between the tasks. Through the cloud computing resources, the agent may request redetermination of the route throughout the agent's workday, thus enabling reduction and/or minimization of travel costs via an acceptable route that is updatable on demand.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

Figure 1:
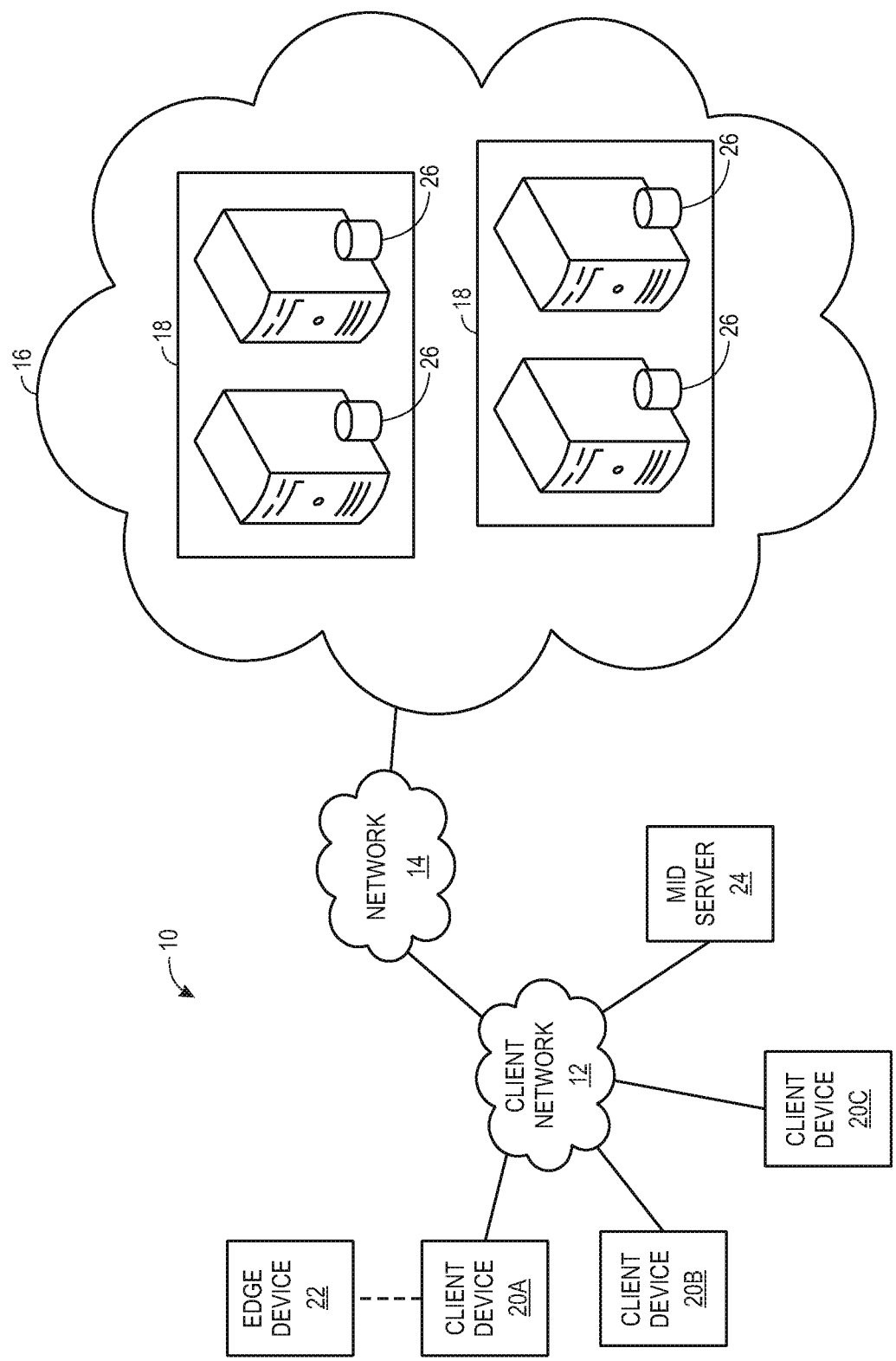
FIG. 1 is a block diagram of an embodiment of a cloud architecture in which embodiments of the present disclosure may operate.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "computing system" refers to an electronic computing device such as, but not limited to, a single computer, virtual machine, virtual container, host, server, laptop, and/or mobile device, or to a plurality of electronic computing devices working together to perform the function described as being performed on or by the computing system. As used herein, the term "medium" refers to one or more non-transitory, computer-readable physical media that together store the contents described as being stored thereon. Embodiments may include non-volatile secondary storage, read-only memory (ROM), and/or random-access memory (RAM). As used herein, the term "application" refers to one or more computing modules, programs, processes, workloads, threads and/or a set of computing instructions executed by a computing system. Example embodiments of an application include software modules, software objects, software instances and/or other types of executable code.

Embodiments of the present disclosure are directed to optimizing a route (e.g., an order in which tasks to be performed at different geographic locations are to be completed) for an agent over a relatively long interval of time, such as an entire workday of the agent. The route is determined by a routing algorithm (e.g., comprehensive algorithm, aggregate algorithm) that considers each task assigned to the agent for the entire workday in aggregate, thus enabling the assigned tasks to be scheduled in a manner that minimizes travel costs (e.g., travel time, travel distance) by comprehensively calculating respective travel costs for each possible route between the assigned tasks. That is, the comprehensive routing functionality disclosed herein encompasses each possible route between a start location, each assigned task, and an end location. For example, the algorithm may determine a travel cost for each route between an end location and one of the assigned tasks. Then, the algorithm may add in another assigned task and determine a travel cost for each route from the end location, to a first assigned task, and then to a second assigned task. Continuing in this manner, the algorithm constructs routes from the end location and through each possible subset of the assigned tasks, while tracking a permutation of each subset having the lowest travel cost. The algorithm may therefore trace back through the lowest-cost permutations to construct a complete route through the assigned tasks that has the lowest cost or most suitable cost for a given set of conditions. For example, as discussed herein, the algorithm may also consider time windows during which the assigned tasks are to be completed, task dependency, task priority, and agent availability during the determinations, facilitating generation of a suitable or useful route (e.g., optimized or optimal route) that provides a minimized travel cost in view of existing limitations.

With the preceding in mind, the following figures relate to various types of generalized system architectures or configurations that may be employed to provide services to an organization in a multi-tenant or multi-instance framework and on which the present approaches may be employed. Correspondingly, these system and platform examples may also relate to systems and platforms on which the techniques discussed herein may be implemented or otherwise utilized. Turning now to FIG. 1, a schematic diagram of an embodiment of a cloud computing system 10, where embodiments of the present disclosure may operate, is illustrated. The cloud computing system 10 may include a client network 12, a network 14 (e.g., the Internet), and a cloud-based platform 16. In some implementations, the cloud-based platform 16 may be a configuration management database (CMDB)

platform. In one embodiment, the client network 12 may be a local private network, such as local area network (LAN) having a variety of network devices that include, but are not limited to, switches, servers, and routers. In another embodiment, the client network 12 represents an enterprise network that could include one or more LANs, virtual networks, data centers 18, and/or other remote networks. As shown in FIG. 1, the client network 12 is able to connect to one or more client devices 20A, 20B, and 20C so that the client devices are able to communicate with each other and/or with the network hosting the platform 16. The client devices 20 may be computing systems and/or other types of computing devices generally referred to as Internet of Things (IoT) devices that access cloud computing services, for example, via a web browser application or via an edge device 22 that may act as a gateway between the client devices 20 and the platform 16. FIG. 1 also illustrates that the client network 12 includes an administration or managerial device or server, such as a management, instrumentation, and discovery (MID) server 24 that facilitates communication of data between the network hosting the platform 16, other external applications, data sources, and services, and the client network 12. Although not specifically illustrated in FIG. 1, the client network 12 may also include a connecting network device (e.g., a gateway or router) or a combination of devices that implement a customer firewall or intrusion protection system.

For the illustrated embodiment, FIG. 1 illustrates that client network 12 is coupled to a network 14. The network 14 may include one or more computing networks, such as other LANs, wide area networks (WAN), the Internet, and/or other remote networks, to transfer data between the client devices 20 and the network hosting the platform 16. Each of the computing networks within network 14 may contain wired and/or wireless programmable devices that operate in the electrical and/or optical domain. For example, network 14 may include wireless networks, such as cellular networks (e.g., Global System for Mobile Communications (GSM) based cellular network), IEEE 802.11 networks, and/or other suitable radio-based networks. The network 14 may also employ any number of network communication protocols, such as Transmission Control Protocol (TCP) and Internet Protocol (IP). Although not explicitly shown in FIG. 1, network 14 may include a variety of network devices, such as servers, routers, network switches, and/or other network hardware devices configured to transport data over the network 14.

In FIG. 1, the network hosting the platform 16 may be a remote network (e.g., a cloud network) that is able to communicate with the client devices 20 via the client network 12 and network 14. The network hosting the platform 16 provides additional computing resources to the client devices 20 and/or the client network 12. For example, by utilizing the network hosting the platform 16, users of the client devices 20 are able to build and execute applications for various enterprise, IT, and/or other organization-related functions. In one embodiment, the network hosting the platform 16 is implemented on the one or more data centers 18, where each data center could correspond to a different geographic location. Each of the data centers 18 includes a plurality of virtual servers 26 (also referred to herein as application nodes, application servers, virtual server instances, application instances, or application server instances), where each virtual server 26 can be implemented on a physical computing system, such as a single electronic computing device (e.g., a single physical hardware server) or across multiple-computing devices (e.g., multiple physical hardware servers). Examples of virtual servers 26 include, but are not limited to a web server (e.g., a unitary Apache installation), an application server (e.g., unitary JAVA Virtual Machine), and/or a database server (e.g., a unitary relational database management system (RDBMS) catalog).

To utilize computing resources within the platform 16, network operators may choose to configure the data centers 18 using a variety of computing infrastructures. In one embodiment, one or more of the data centers 18 are configured using a multi-tenant cloud architecture, such that one of the server instances 26 handles requests from and serves multiple customers. Data centers 18 with multi-tenant cloud architecture commingle and store data from multiple customers, where multiple customer instances are assigned to one of the virtual servers 26. In a multi-tenant cloud architecture, the particular virtual server 26 distinguishes between and segregates data and other information of the various customers. For example, a multi-tenant cloud architecture could assign a particular identifier for each customer in order to identify and segregate the data from each customer. Generally, implementing a multi-tenant cloud architecture may suffer from various drawbacks, such as a failure of a particular one of the server instances 26 causing outages for all customers allocated to the particular server instance.

In another embodiment, one or more of the data centers 18 are configured using a multi-instance cloud architecture to provide every customer its own unique customer instance or instances. For example, a multi-instance cloud architecture could provide each customer instance with its own dedicated application server and dedicated database server. In other examples, the multi-instance cloud architecture could deploy a single physical or virtual server 26 and/or other combinations of physical and/or virtual servers 26, such as one or more dedicated web servers, one or more dedicated application servers, and one or more database servers, for each customer instance. In a multi-instance cloud architecture, multiple customer instances could be installed on one or more respective hardware servers, where each customer instance is allocated certain portions of the physical server resources, such as computing memory, storage, and processing power. By doing so, each customer instance has its own unique software stack that provides the benefit of data isolation, relatively less downtime for customers to access the platform 16, and customer-driven upgrade schedules. An example of implementing a customer instance within a multi-instance cloud architecture will be discussed in more detail below with reference to FIG. 2.

Figure 2:
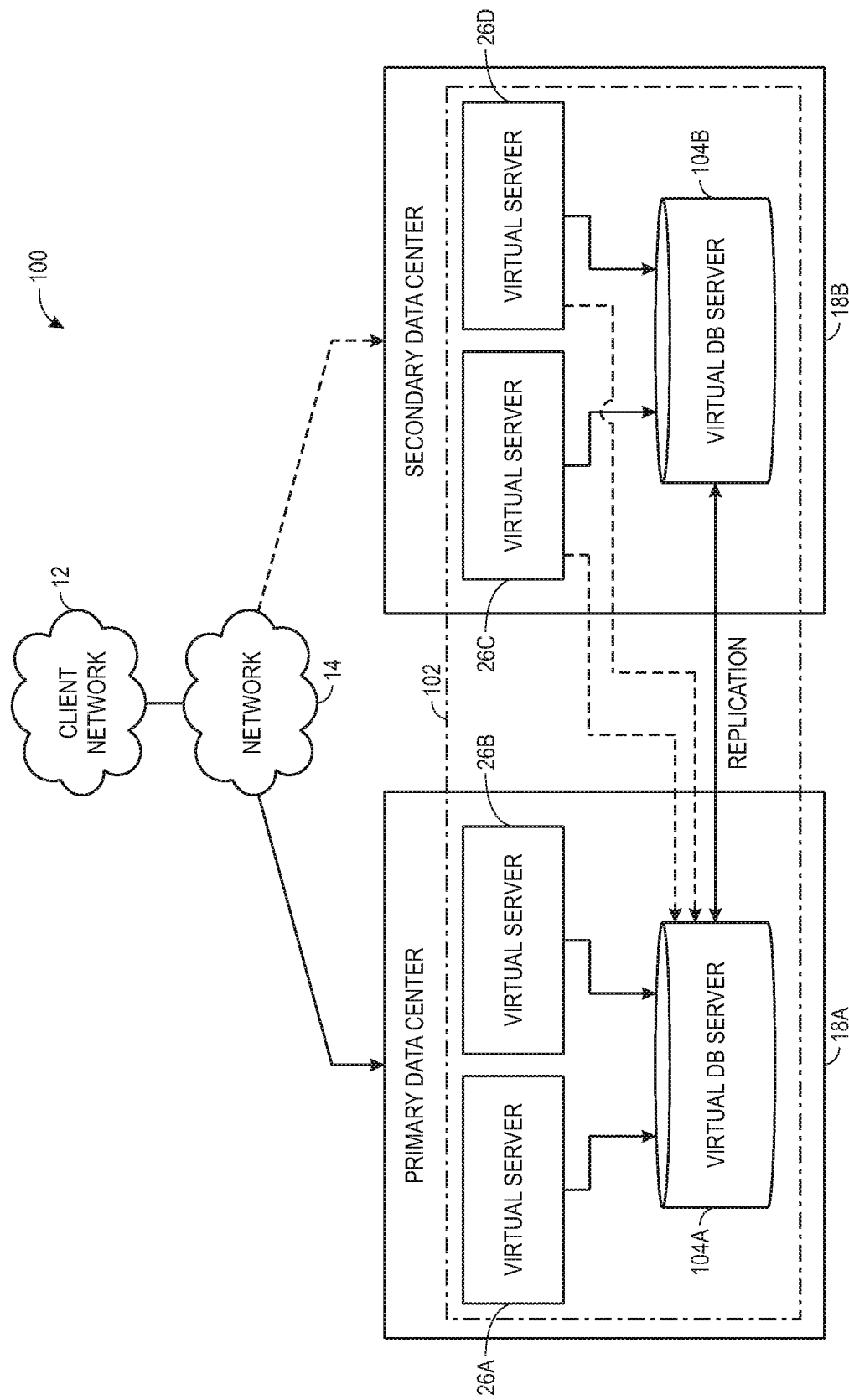
FIG. 2 is a schematic diagram of an embodiment of a multi-instance cloud architecture in which embodiments of the present disclosure may operate.

FIG. 2 is a schematic diagram of an embodiment of a multi-instance cloud architecture 100 where embodiments of the present disclosure may operate. FIG. 2 illustrates that the multi-instance cloud architecture 100 includes the client network 12 and the network 14 that connect to two (e.g., paired) data centers 18A and 18B that may be geographically separated from one another. Using FIG. 2 as an example, network environment and service provider cloud infrastructure client instance 102 (also referred to herein as a client instance 102) is associated with (e.g., supported and enabled by) dedicated virtual servers (e.g., virtual servers 26A, 26B, 26C, and 26D) and dedicated database servers (e.g., virtual database servers 104A and 104B). Stated another way, the virtual servers 26A-26D and virtual database servers 104A and 104B are not shared with other client instances and are specific to the respective client instance 102. In the depicted example, to facilitate availability of the client instance 102, the virtual servers 26A-26D and virtual database servers 104A and 104B are allocated to two different data centers 18A and 18B so that one of the data centers 18 acts as a backup data center. Other embodiments of the multi-instance cloud architecture 100 could include other types of dedicated virtual servers, such as a web server. For example, the client instance 102 could be associated with (e.g., supported and enabled by) the dedicated virtual servers 26A-26D, dedicated virtual database servers 104A and 104B, and additional dedicated virtual web servers (not shown in FIG. 2).

Although FIGS. 1 and 2 illustrate specific embodiments of a cloud computing system 10 and a multi-instance cloud architecture 100, respectively, the disclosure is not limited to the specific embodiments illustrated in FIGS. 1 and 2. For instance, although FIG. 1 illustrates that the platform 16 is implemented using data centers, other embodiments of the platform 16 are not limited to data centers and can utilize other types of remote network infrastructures. Moreover, other embodiments of the present disclosure may combine one or more different virtual servers into a single virtual server or, conversely, perform operations attributed to a single virtual server using multiple virtual servers. For instance, using FIG. 2 as an example, the virtual servers 26A, 26B, 26C, 26D and virtual database servers 104A, 104B may be combined into a single virtual server. Moreover, the present approaches may be implemented in other architectures or configurations, including, but not limited to, multi-tenant architectures, generalized client/server implementations, and/or even on a single physical processor-based device configured to perform some or all of the operations discussed herein. Similarly, though virtual servers or machines may be referenced to facilitate discussion of an implementation, physical servers may instead be employed as appropriate. The use and discussion of FIGS. 1 and 2 are only examples to facilitate ease of description and explanation and are not intended to limit the disclosure to the specific examples illustrated therein.

As may be appreciated, the respective architectures and frameworks discussed with respect to FIGS. 1 and 2 incorporate computing systems of various types (e.g., servers, workstations, client devices, laptops, tablet computers, cellular telephones, and so forth) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion.

Figure 3:
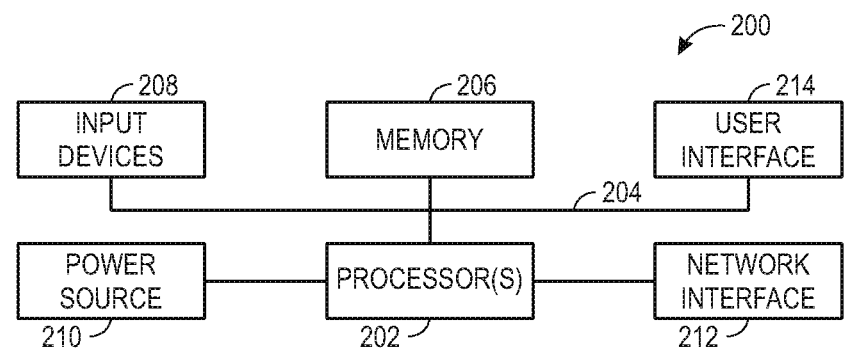
FIG. 3 is a block diagram of a computing device utilized in a computing system that may be present in FIG. 1 or 2, in accordance with aspects of the present disclosure.

With this in mind, and by way of background, it may be appreciated that the present approach may be implemented using one or more processor-based systems such as shown in FIG. 3. Likewise, applications and/or databases utilized in the present approach stored, employed, and/or maintained on such processor-based systems. As may be appreciated, such systems as shown in FIG. 3 may be present in a distributed computing environment, a networked environment, or other multi-computer platform or architecture. Likewise, systems such as that shown in FIG. 3, may be used in supporting or communicating with one or more virtual environments or computational instances on which the present approach may be implemented.

With this in mind, an example computer system may include some or all of the computer components depicted in FIG. 3. FIG. 3 generally illustrates a block diagram of example components of a computing system 200 and their potential interconnections or communication paths, such as along one or more busses. As illustrated, the computing system 200 may include various hardware components such as, but not limited to, one or more processors 202, one or more busses 204, memory 206, input devices 208, a power source 210, a network interface 212, a user interface 214, and/or other computer components useful in performing the functions described herein.

The one or more processors 202 may include one or more microprocessors capable of performing instructions stored in the memory 206. Additionally or alternatively, the one or more processors 202 may include application-specific integrated circuits (ASICs), field-programmable gate arrays (FPGAs), and/or other devices designed to perform some or all of the functions discussed herein without calling instructions from the memory 206.

With respect to other components, the one or more busses 204 include suitable electrical channels to provide data and/or power between the various components of the computing system 200. The memory 206 may include any tangible, non-transitory, and computer-readable storage media. Although shown as a single block in FIG. 1, the memory 206 can be implemented using multiple physical units of the same or different types in one or more physical locations. The input devices 208 correspond to structures to input data and/or commands to the one or more processors 202. For example, the input devices 208 may include a mouse, touchpad, touchscreen, keyboard and the like. The power source 210 can be any suitable source for power of the various components of the computing system 200, such as line power and/or a battery source. The network interface 212 includes one or more transceivers capable of communicating with other devices over one or more networks (e.g., a communication channel). The network interface 212 may provide a wired network interface or a wireless network interface. A user interface 214 may include a display that is configured to display text or images transferred to it from the one or more processors 202. In addition and/or alternative to the display, the user interface 214 may include other devices for interfacing with a user, such as lights (e.g., LEDs), speakers, and the like.

Figure 4:
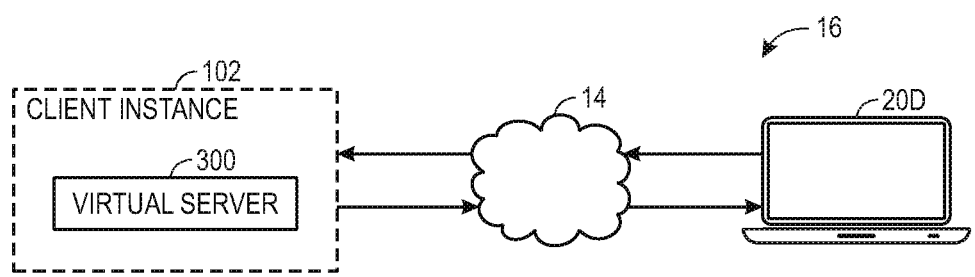
FIG. 4 is a block diagram illustrating an embodiment in which a virtual server supports and enables the client instance, in accordance with aspects of the present disclosure.

With the foregoing in mind, FIG. 4 is a block diagram illustrating an embodiment in which a virtual server 300 supports and enables the client instance 102, according to one or more disclosed embodiments. More specifically, FIG. 4 illustrates an example of a portion of a service provider cloud infrastructure, including the cloud-based platform 16 discussed above. The cloud-based platform 16 is connected to a client device 20D via the network 14 to provide a user interface to cloud-based applications executing within the client instance 102 (e.g., via a web browser of the client device 20D). Client instance 102 is supported by virtual servers 26 similar to those explained with respect to FIG. 2, and is illustrated here to show support for the disclosed routing functionality described herein in the context of the client instance 102. Cloud provider infrastructures are generally configured to support a plurality of end-user devices, such as client device 20D, concurrently, wherein each end-user device is in communication with the single client instance 102. Also, cloud provider infrastructures may be configured to support any number of client instances, such as client instance 102, concurrently, with each of the instances in communication with one or more end-user devices. As mentioned above, an end-user may also interface with client instance 102 using an application that is executed within a web browser.

As mentioned above, present embodiments are directed toward an algorithm (e.g., routing algorithm, route-optimizing algorithm) for generating an acceptable route between a set of tasks assigned to an agent for a particular time period. Such routing functionality may be supported and enhanced by deployment on a cloud-based infrastructure as described herein, such as in an multi-instance or multi-tenant architecture as described above. Thus, the algorithm may be implemented on the cloud-based platform 16 and accessed by the agent through the client instance 102. However, it is to be understood that the algorithm may alternatively be performed locally on the client devices 20 or by any other suitable computing devices for generating acceptable routes between any suitable number of locations of interest. Indeed, with respect to the techniques discussed herein, these techniques may be implemented in a multi-instance architecture as described herein, a multi-tenant architecture, a client-server or public network (i.e., Internet) context, or, in some instances, on a single computer or server suitably configured.

Figure 5:
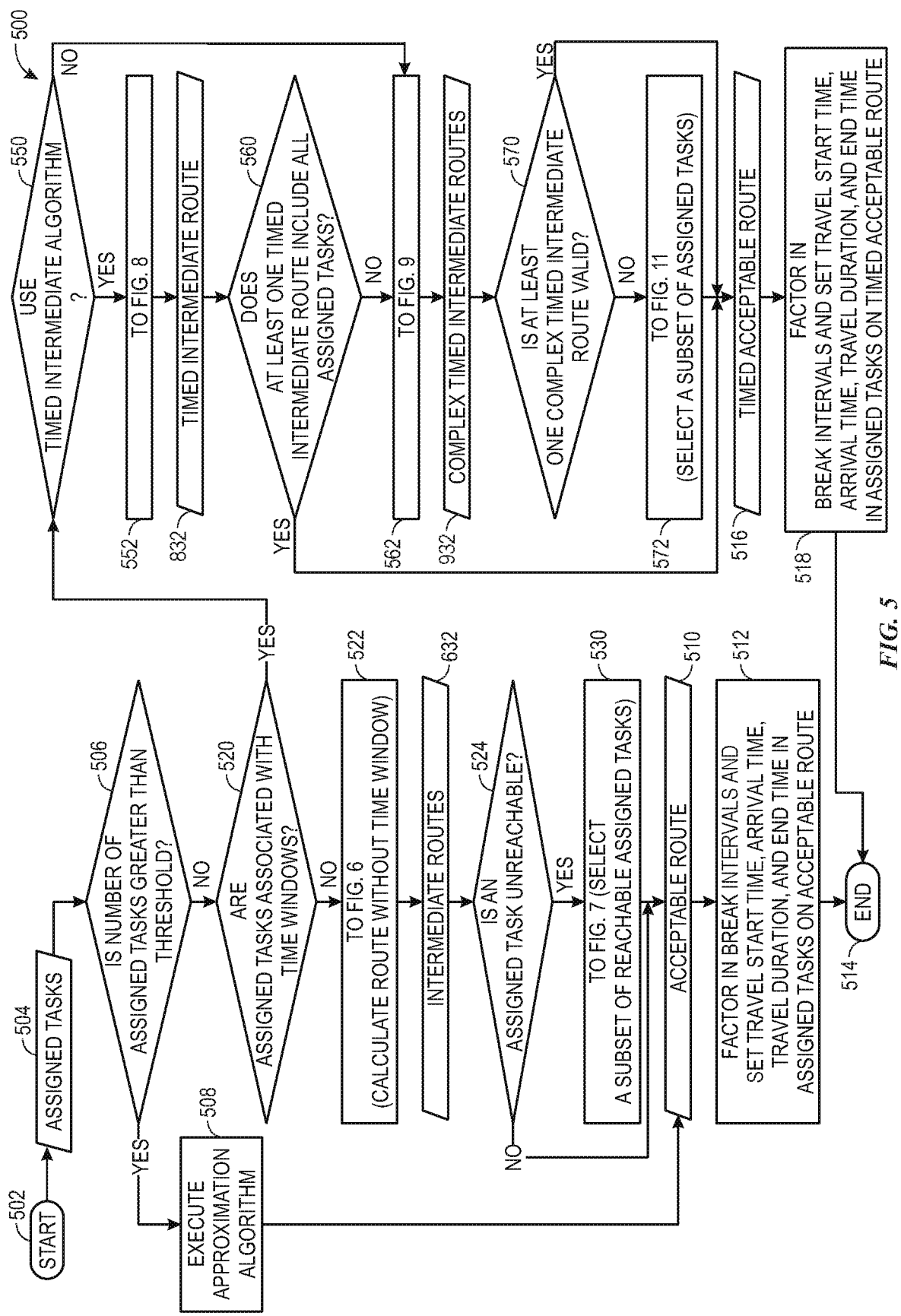
FIG. 5 is a flow diagram of an embodiment of a top-level process of a routing algorithm for determining which of multiple sub-level processes may be performed to generate a suitable route, in accordance with aspects of the present disclosure.

With the preceding context in mind, FIG. 5 is a flow chart of an embodiment of a process 500 (e.g., top-level process) to generate an acceptable route (e.g., ordering or schedule of geographically separated tasks) for an agent to follow to perform a set of tasks, in accordance with aspects of the present disclosure. The steps illustrated in the process 500 are meant to facilitate discussion and are not intended to limit the scope of this disclosure, because additional steps may be performed, certain steps may be omitted, and the illustrated steps may be performed in an alternative order or in parallel, where appropriate. The process 500 may be implemented by an algorithm implemented on or accessible via the client instance 102, the network 14, the cloud-based platform 16, or a combination thereof. In some embodiments, the algorithm is a Java algorithm that is executed on the cloud-based platform 16, which provides a rapid run time (e.g., on the order of milliseconds (ms)); however, it is to be understood that the algorithm may be implemented as a Java Script algorithm or as an algorithm in any other suitable programming language or environment.

Once tasks are assigned to an agent, the algorithm disclosed herein is particularly suited at determining an acceptable or suitable order in which the assigned tasks, or a subset of the assigned tasks, may be efficiently traveled to and completed by the agent. That is, the algorithm determines a route between assigned tasks that reduces or minimizes a travel cost (e.g., the travel time, travel distance) for a suitable route between geographic locations associated with the assigned tasks. As such, the algorithm following the process 500 starts (block 502) by receiving a set of assigned tasks 504 for an agent. In certain embodiments, tasks may be submitted by (or retrieved from) one or more customers or uploaded by the client, such as through the client instance 42, and subsequently distributed or assigned to the agent through the cloud-based platform 16 as the assigned tasks 504. The assigned tasks 504 may include, for example, installation of a system (e.g., a network), system/component maintenance or repair, troubleshooting, delivery of a component, and so forth. To be processed or analyzed by the algorithm, each assigned task 504 of the assigned tasks 504 may be stored as an entry in a set or multi-dimensional array, with any suitable accompanying details. For example, each assigned task 504 may be associated with a set of constraints, or task details, which should be considered when routing the task. The task details for a task may include, for example, a location of the task, a time window or time constraints for the task, a priority level of the task, and/or a task dependency of the task.

With respect to the task details considered by the algorithm, the location of a task may refer to the physical, geographic location of the task. The location of the task may be associated with a set of geographic coordinates and/or an address. Specifically, the location of the task may be considered when determining travel times to/from the task. Additionally, a time window or time constraints for a task may refer to a customer availability, time range, or appointment window to perform the task as requested by the customer (e.g., the party that requested the task). The time window may also be defined by operational hours of the customer, such as when the account/company associated with the customer is open and willing to have work performed. The time window may further refer to blackout hours, such as when a particular asset associated with the task cannot be worked on. For example, if the task is related to maintenance of a network, blackout hours may be associated with high traffic times of the network. In some embodiments, the time windows for the assigned tasks 504 may be processed with respect to agent availability including scheduled breaks of the agent, such that tasks are not scheduled during a meal break or meeting of the agent's workday. Moreover, a priority level of a task may refer to a relative importance of the task compared to one or more other tasks. For example, a task that affects multiple customers or a task that is requested by a customer having a high service level plan with the client may be considered as high-priority and scheduled before other, lower-priority tasks in some embodiments. Further, a task dependency of a task may refer to the dependency of a first task relative to one or more other tasks. For example, in certain embodiments, the first task may only be performed once one or more other tasks have first been completed. Accordingly, the first task should not be scheduled until a time when the one or more other tasks have been completed.

To enable conformance with processing resource limitations, the algorithm following process 500 determines which sub-level process of multiple sub-level processes to perform based on a number of pre-requisite conditions. Indeed, because routes may be determined for multiple agents of an enterprise, employing fewer calculation-heavy determinations when possible enables the cloud-based platform 16 to more rapidly compute each of multiple requested suitable routes (e.g., by directing more processing resources to the computations) or to simultaneously compute a greater number of suitable routes. Thus, based on the assigned tasks 504, the algorithm determines (block 506) whether the number of assigned tasks 504 for the agent is greater than a threshold number of assigned tasks. The threshold number of assigned tasks may be set based on functional processing limitations of the cloud-based platform 16 and/or based on a service level of service the client has with the cloud-computing system provider, such that higher service level clients may request generation of routes with a greater number of assigned tasks than lower service level clients. In some embodiments, the threshold number of assigned tasks is 5, 10, 15, 20, or more assigned tasks. The threshold number of assigned tasks in some embodiments may be set based on a threshold running time for the algorithm on an associated computing device or system, such that a number of assigned tasks 504 that cause one or more of the processes of FIGS. 6-11 to have a running time that is greater than a threshold running time is set as the threshold number of assigned tasks. The threshold running time may be 0.5 seconds, 1 second, 1.5 seconds, 2 seconds, or more in some embodiments.

In response to determining that the number of assigned tasks 504 is greater than the threshold number of assigned tasks, the algorithm may execute (block 508) an approximation algorithm to determine a route between the relatively-large number of assigned tasks 504. As recognized herein, directing the algorithm to employ the approximation algorithm in high-task number situations may prevent long computation times, time-outs, and/or overexertion of the cloud-based platform 16. In some embodiments, the algorithm may output an indication to the agent that the number of assigned tasks 504 is greater than the threshold number, and enable the agent to either provide input indicative of a desire to proceed with the approximation algorithm or to select a subset of the assigned tasks 504 that is less than the threshold number so that acceptable routes for the selected subset may be determined by additional aspects of the algorithm performing the process 500.

The approximation algorithm may be an embodiment of the routing sequence of U.S. Pat. No. 9,911,087, issued Mar. 6, 2018, the disclosure of which is herein incorporated by reference in its entirety for all purposes. In one such implementation, a route may be computed between various geographic task sites by setting a task site that has a shortest travel time (or is geographically nearest to) to a previous task site (or start location) as a next task site, enabling rapid generation of a satisfactory route between large numbers of task sites. The sequence is configured to determine the travel times between respective task sites by a third-party request, or when possible or desired, by a straight-line estimate. Use of the straight-line estimate may desirably reduce or minimize calls to a third-party service by first geographically expanding both origin and destination coordinates, and then searching a cache of previously computed or obtained travel times for any route satisfying the expanded origin and destination coordinates.

More particularly, the sequence begins by determining a travel time between a start location (e.g., route end point) of the agent and each of the task sites. The sequence then designates one of the task sites that is geographically nearest the start location as a current task site. The sequence continues this operation to designate one of the remaining task sites closest to the current task as the next current task, thus preparing a single virtual route proceeding in series from the current task site to each of the remaining task sites.

The sequence may also sort any task sites with time window conditions according to time window end times, to enable tasks with a chronologically earlier time window to be scheduled within a virtual route earlier than tasks with a chronologically later time window. Task sites without any time conditions may be placed in any suitable location within the virtual route, grouped at an end of the virtual route, or otherwise suitably positioned. In some embodiments, the sequence computes every possible route among the no-condition tasks, and selects the route with the least overall travel time to add to the virtual route. The sequence then determines whether the current virtual route resulted in any unschedulable tasks, such as those which could not be completed during an applicable time window. If any tasks were unschedulable, the sequence determines whether the virtual route has been computed with all remaining task sites set as the current task to which the agent is routed to from the start location. In response to a negative determination, the sequence designates a different task, such as a second-closest task to the start location, as the current task and computes a new hypothetical route thereto and continuing through the remaining task sites. This process continues until there are no more tasks that are unschedulable or until all of the remaining task sites have been set as the first or current task. When all of the remaining task sites have been set as the current task site and an unschedulable task remains, the sequence may select the current task as the one resulting in a virtual route with the fewest unschedulable tasks.

Then, the sequence adds the current task to a final route, fixing an order that the current task will be performed relative to the other tasks in the final route. The sequence then determines whether there are two or more tasks remaining in the current task set, which is reduced by any tasks added to the final route. If so, the start location is set as the current task, the current task is removed from the input tasks, and the sequence returns to obtain the travel time between the new start location and each of the remaining input tasks. Once the input task set contains two tasks, the hypothetical route is finished and an ordered listing of tasks or task sites is output.

Accordingly, when the number of assigned tasks 504 is greater than the threshold number of assigned tasks, the algorithm executes (block 508) the approximation algorithm as discussed above to generate an acceptable route 510 (e.g., optimized route) between the assigned tasks 504. The acceptable route 510 may be an ordered list (e.g., tuple) of the assigned tasks 504 and their corresponding locations for the agent to travel between and complete. In other words, the acceptable route 510 routes the agent from one route end point to another route end point. Indeed, as used herein, the route end point is either an initial location or a final location of the agent.

After generating the acceptable route 510, the algorithm factors (block 512) in break intervals for the agent to set a travel start time, arrival time, travel duration, and end time for the assigned tasks 504 on the acceptable route 510. The break intervals are based on the agent availability introduced above, which includes working hours of the agent and scheduled breaks such as meal breaks or meetings of the agent. The work duration for each assigned task 504 may be set based on a default duration or an agent-specific duration for a given task, an average duration of each corresponding assigned task previously completed by the agent or the enterprise, and/or machine learning and so forth. In view of the timing considerations for the agent and the assigned tasks 504, the algorithm updates the acceptable route 510, signaling an end (514) of the process 500. In other embodiments, timing considerations of the assigned tasks 504 and/or the agent may be considered by the algorithm during generation of an initial acceptable order in which the assigned tasks 504 are to be completed.

The algorithm may output the acceptable route 510 in any suitable format, such as within a user interface of a client instance 102, on a client device 20, as a list that is texted or emailed to a computing device associated with the agent, or any other suitable distribution format. In some embodiments, the client instance 42 may communicate the route to computing devices associated with other users (e.g., administration personnel), such that the agents may be informed of their respective routes for a time period or working period. In some embodiments, the algorithm may continuously update the acceptable route 510 based on unassigned (e.g., incoming) tasks. That is, in certain embodiments, the acceptable route 510 or other routes determined by the algorithm may be tentative or otherwise subject to modification in that the algorithm may reevaluate the acceptable route 510 as new tasks are created/requested/submitted and assigned to the agent.

Alternatively, in response to determining at block 506 that the number of assigned tasks 504 is less than the threshold number of assigned tasks, the algorithm proceeds to determine (block 520) whether the assigned tasks 504 are associated with time windows. The determination of block 520 may be made by analyzing a multi-dimensional array of values associated with the assigned tasks 504 to identify any indicators of a requested time window. In some embodiments, the time window data is stored in a specific dimension within the assigned tasks 504, such that the algorithm determines that 2-dimensional arrays do not include time windows, while 3-dimensional arrays do include time windows. In response to determining that none of the assigned tasks 504 are associated with time windows, the algorithm proceeds to execute (block 522) a sub-level process set forth by FIG. 6 for generating routes without time constraints.

Figure 6:
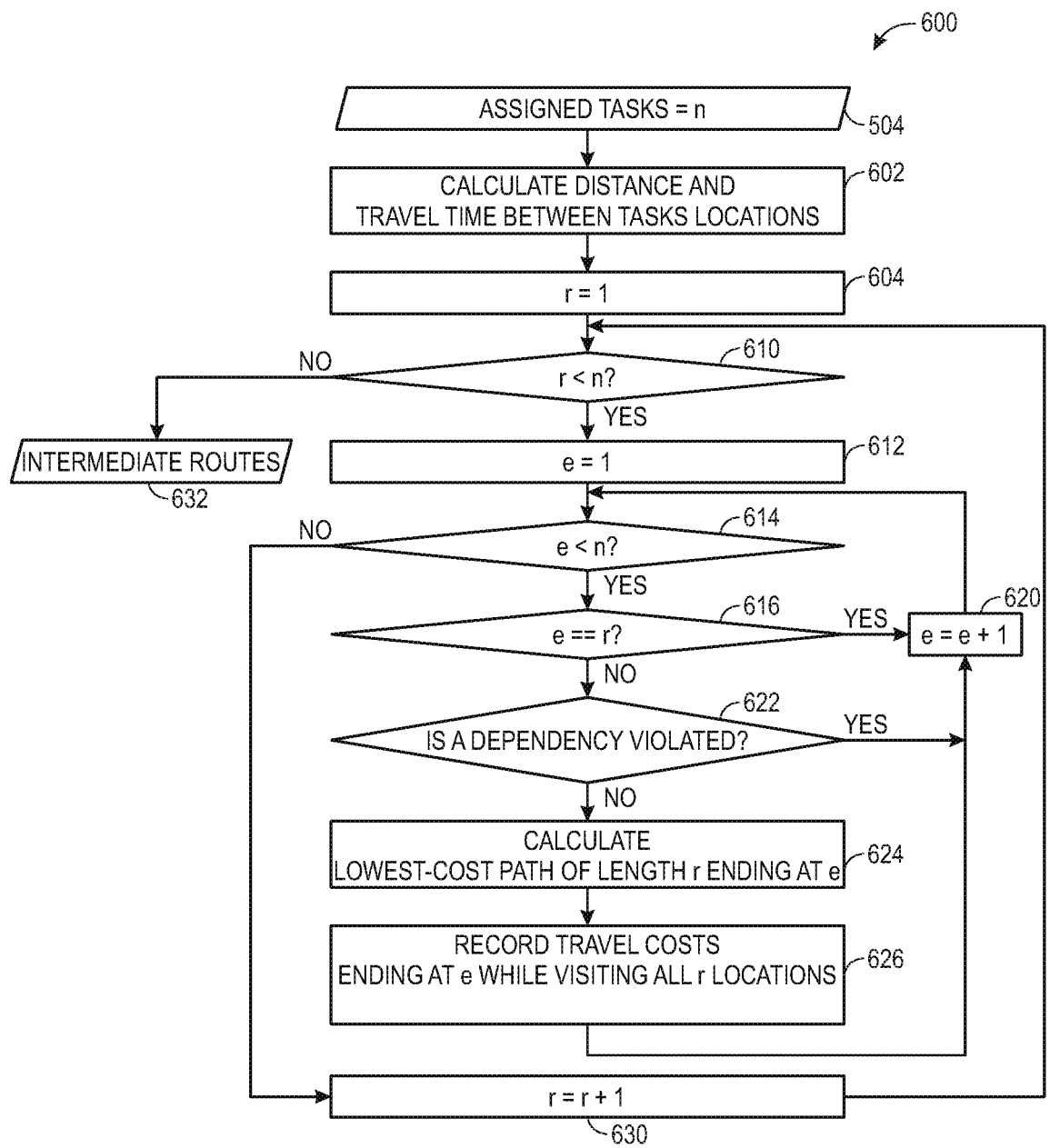
FIG. 6 is a flow diagram of an embodiment of a sub-level process for generating all suitable routes with lowest costs between tasks without time constraints, in accordance with aspects of the present disclosure.

Looking now to FIG. 6, FIG. 6 is a flow chart of an embodiment of a process 600 (e.g., sub-level process) to be implemented by the algorithm for generating all suitable routes with lowest costs between tasks without time constraints, in accordance with aspects of the present disclosure. The steps illustrated in the process 600 are meant to facilitate discussion and are not intended to limit the scope of this disclosure, because additional steps may be performed, certain steps may be omitted, and the illustrated steps may be performed in an alternative order or in parallel, where appropriate. Based on the assigned tasks 504, a variable n is set as the total number of locations in the assigned tasks 504, inclusive of a start location of the agent. First, the algorithm calculates (block 602) a distance and a travel time between task locations associated with the assigned tasks 504. The distance and/or travel times between the task locations may be calculated by any suitable manner, such as by querying a third-party application programming interface (API). For simplicity, the task locations are also referred to herein as tasks. Additionally, a variable r, which is the number of locations to be visited from the start location, is set (block 604) as n.

With n and r initialized, the algorithm following the process 600 determines (block 610) whether r is less than n. In response to determining that r is less than n, such as when there are more than one task included in the assigned tasks 504, the algorithm sets (block 612) a variable e to have a value of 1, which represents a location index at which a current route ends. The algorithm then determines (block 614) whether e is less than n. In response to determining that e is less than n, the algorithm determines (block 616) whether e is equal to r. In response to determining that e is equal to r, the algorithm increments (block 620) e by one and returns to block 614. In response to determining that e is not equal to r, the algorithm determines (block 622) whether a dependency is violated by a proposed route between the location of a task at index r in the assigned tasks 504 and the location of a task at index e in the assigned tasks 504. For example, if the task at index e is not to be completed until a different task is completed, the algorithm may determine that a dependency is violated if the algorithm attempts to schedule the task at index e for completion before the different task. In such situations, in response to determining a dependency is violated, the algorithm increments (block 620) e by one and returns to block 614, as discussed above.

In response to determining that a dependency is not violated, the algorithm determines (block 624) a lowest-cost path of length r ending at e, in line with any restrictions associated with performing the assigned tasks 504. Following block 624, the algorithm records (block 626) the travel cost for the lowest-cost route ending at e, while visiting all r locations. Then, the algorithm following the process 600 increments (block 620) e by one and returns to block 614. Because e is being incremented throughout portions of the process 600 that evaluate various subsets of the assigned tasks 504, the determination at block 614 will eventually result in a determination that e is not less than n. Thus, in response to determining that e is not less than n, the algorithm increments (block 630) r by one and returns to block 610 to analyze subsets of the assigned tasks 504 having a greater size. The above-introduced steps are thus cycled through until the algorithm determines at block 610 that r is not less than n, indicating that subsets of the assigned tasks 504 of each size have been processed by the algorithm. In response to determining that r is not less than n, the algorithm therefore outputs one or multiple intermediate routes 632 that each suitably route the agent between the assigned tasks 504, in line with task dependences. Although the intermediate routes 632 are denoted as intermediate in view of additional processing steps that may be performed by the process 500 of FIG. 5, it is to be understood that the intermediate routes 632, or a lowest-cost route(s) thereof, may instead be considered final, suitable routes that are provided to the agent, in some embodiments.

With the intermediate routes 632 determined, the algorithm may return to process 500 of FIG. 5 for further evaluation of the intermediate routes 632. That is, with reference now to FIG. 5, the algorithm may determine (block 524) whether one or more of the assigned tasks 504 are unreachable. For example, if one or more of the assigned tasks 504 were identified by the process 600 of FIG. 6 as being infeasible or causing creation of a route with an unacceptable smallest cost, the algorithm may identify the one or more assigned tasks 504 as unreachable in view of existing constraints. In such situations and others, in response to determining that an assigned task 504 is unreachable, the algorithm following process 500 may proceed to execute (block 530) a sub-level process set forth by FIG. 7 to generate a new intermediate route 632 between the subset of the assigned tasks 504. Alternatively, in response to determining that each assigned task of the assigned tasks 504 (or the subset of assigned tasks 504) is reachable, the algorithm may output the lowest cost intermediate route 632 as the acceptable route 510. Then, the algorithm proceeds to factor (block 512) in the break intervals, travel start, arrival time, travel duration, and end time to end (block 514) the process 500, as discussed above.

Figure 7:
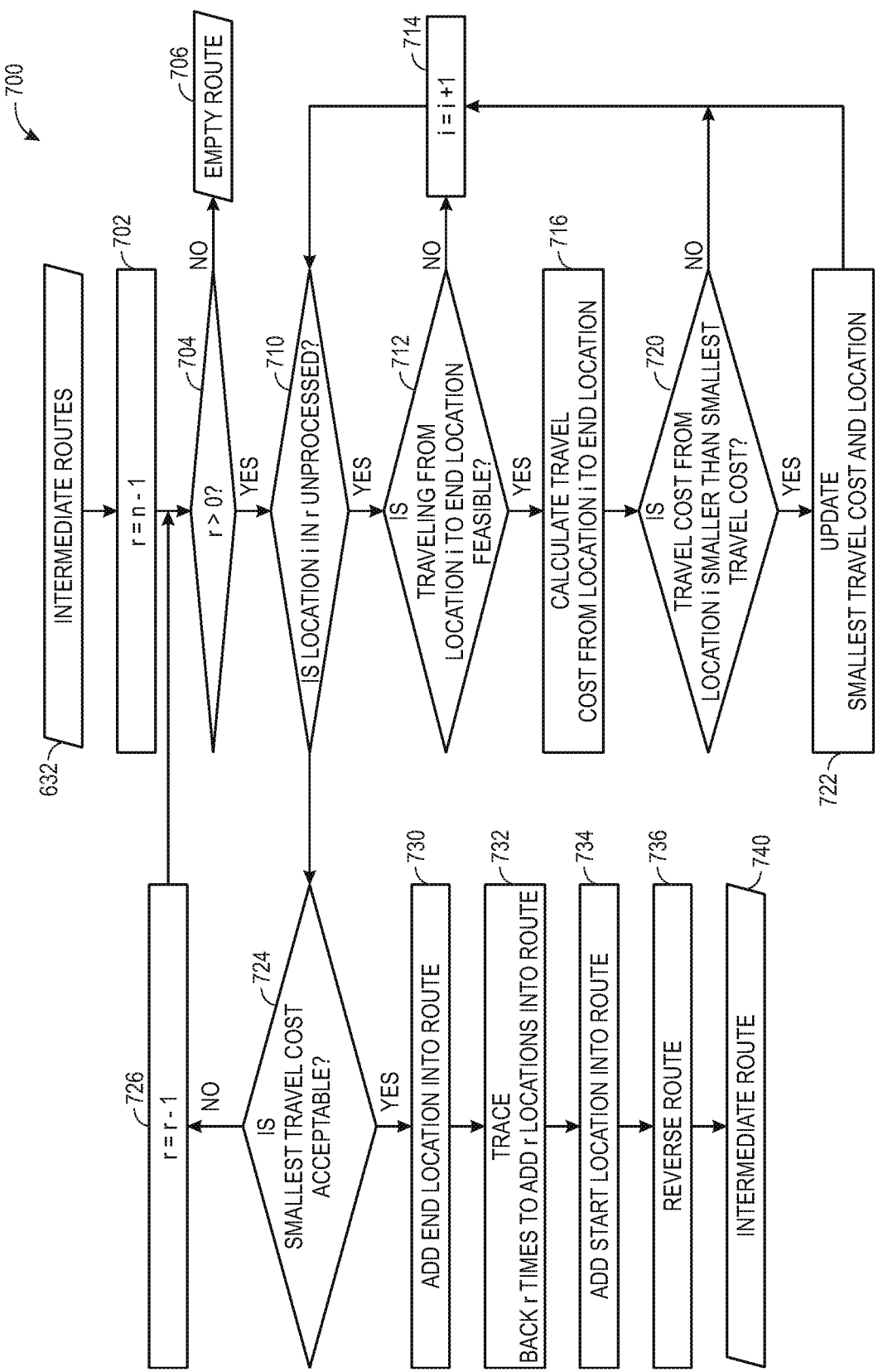
FIG. 7 is a flow diagram of an embodiment of a sub-level process for generating a suitable route between a subset of tasks without time constraints, in accordance with aspects of the present disclosure.

Looking now to FIG. 7, FIG. 7 is a flow chart of an embodiment of a process 700 (e.g., sub-level process) to be implemented by the algorithm for generating a suitable route between a subset of tasks without time constraints, in accordance with aspects of the present disclosure. The steps illustrated in the process 700 are meant to facilitate discussion and are not intended to limit the scope of this disclosure, because additional steps may be performed, certain steps may be omitted, and the illustrated steps may be performed in an alternative order or in parallel, where appropriate. Based on the intermediate routes 632 generated by the process 600 of FIG. 6, the variable n remains set as the total number of locations in the assigned tasks 504. Additionally, a variable r, which is the number of locations to be visited from the start location, is set (block 702) as n−1 to reduce the number of assigned tasks 504 included in the route generation, thereby enabling generation of a route between a subset of the assigned tasks 504.

The algorithm following process 700 next determines (block 704) whether r is greater than zero. In response to determining that r is not greater than zero, the algorithm may output an empty route 706 that does not include any scheduled service tasks. Based on the empty route 706, the agent or a service administrator may determine that no incomplete tasks are currently assigned to the agent or no acceptable route exists between the subset of the assigned tasks 504. Thus, in some embodiments, the agent may be assigned one or more new or different tasks and the process 500 of FIG. 5 may be re-executed with a new set of assigned tasks 504.

When the empty route 706 is not provided in response to the determination at block 704, the process 700 iterates through each possible permutation of various subsets of the assigned tasks 504 to identify an acceptable route therebetween having a suitably low or the lowest travel cost for a given set of conditions. As such, index variable i, used as a place marker or index through the subsequent determinations, is initialized to one. More particularly, in response to determining that r is greater than zero, the algorithm determines (block 710) whether an assigned task 504 at location i within r is unprocessed. For example, during a first iteration through block 710, i is one and the first task in the assigned tasks 504 is unprocessed. The algorithm then proceeds to determine (block 712) whether traveling from the assigned task 504 at location i to an end location is feasible. The feasibility of traveling from the assigned task 504 to the end location may be determined based on a maximum travel distance and/or a maximum travel time that is not to be exceeded or based on a correspondence with task dependencies and priorities, in some embodiments. Alternatively, the assigned task 504 may be considered infeasible if it is the furthest or one of the furthest task of the assigned tasks 504 from the start location. If such traveling is infeasible, the algorithm increments (block 714) i by one and returns to block 710 to determine whether the next assigned task 504 at the new location i in r is unprocessed. Assigned tasks 504 that are infeasible for the agent to reach during the working period may be noted and stored for future reference by the algorithm or incorporated in subsequent steps of the process 700.

In response to determining that traveling from the assigned task 504 at location i to the end location is feasible, the algorithm calculates (block 716) a travel cost for traveling from location i to the end location. Based on client preference, in some embodiments, the travel cost may be determined based on a travel time or based on a travel distance for the agent to travel along a route to and from (e.g., between) two or more locations. That is, in certain embodiments such as those discussed herein, minimization of the total time spent traveling and minimization of the total distance traveled may be combined into a single metric of minimizing travel costs. An estimated time for completing each assigned task 504 may also be added into travel time determinations for a working period of the agent. Further, in certain embodiments, the travel time and/or travel distance may be estimated using calls or requests to APIs, which return the requested travel time and/or travel distance. In some embodiments, the travel time and/or travel distance may be estimated using straight line distances and regional average speeds, or previous data, if a particular route between task sites has been previously processed.

Then, the algorithm determines (block 720) whether the travel cost determined at block 716 is smaller than a previously determined smallest travel cost, which may be a multi-dimensional variable or array that is initialized as a null or blank value before a first execution of block 720 for a given r value, in some embodiments. In response to determining that the travel cost is not smaller than the smallest travel cost, the algorithm increments (block 714) i by one and returns to block 710 as discussed above. In response to determining that the travel cost is smaller than the smallest travel cost (e.g., or is the first determined travel cost for a corresponding r value), the algorithm updates (block 722) the variable storing the smallest travel cost and location to correspond to the travel cost for traveling from location i to the end location. Then, the algorithm proceeds to increment (block 714) i by one and return to block 710. The algorithm following the process 700 therefore cycles through each assigned task of the assigned tasks 504 to identify 1) any infeasible locations and 2) the lowest-cost route between one of the assigned tasks and the end location for the present conditions associated with the assigned tasks 504.

Once the algorithm determines at block 710 that the newly incremented i in r is not unprocessed, the algorithm determines (block 724) whether the smallest cost identified from the steps of process 700 above is acceptable. For example, if the agent is scheduled to work for 8 hours, and the lowest-cost route between each of the assigned tasks 504 will take 9 hours, the algorithm may determine that the smallest cost is not acceptable. In such a situation and others, the algorithm decrements (block 726) r by one to remove one of the assigned tasks 504 from consideration and returns to block 704 to determine whether r is greater than zero. In response to determining that r is not greater than zero, the algorithm generates the empty route 706 indicative of a lack of acceptable routes between the assigned tasks 504. In response to determining that r is greater than zero, the algorithm proceeds to block 710 and the subsequent steps discussed above to identify a new smallest cost route between the end location and a reduced number of the assigned tasks 504. In some embodiments, the agent may alternatively be provided an option to select and perform the route having the smallest cost that is not acceptable (e.g., pending supervisor approval), such that the algorithm receives user input indicative of a selection of an elongated work window and proceeds to block 730 discussed below.

In response to determining the smallest cost is acceptable, the algorithm adds (block 730) the end location into the route. The algorithm also traces (block 732) back through the assigned tasks r times to add r locations into the route. Then, the algorithm adds (block 734) the start location to the end of the route. Because the route was constructed in reverse, the algorithm reverses (block 736) the route, such that the route begins at the start location and ends at the end location. Thus, the algorithm traces back through identified tasks to generate an intermediate route 740 that suitably routes the agent between each feasible task of the assigned tasks 504 in a suitable manner. The intermediate route 740 is denoted as intermediate in view of additional processing steps that may be performed by the process 500 of FIG. 5; however, the intermediate route 740 may be considered a final, acceptable route that is provided to the agent, in some embodiments.

With the above steps for tracing back through the assigned tasks 504 to determine the intermediate route 740 in mind, further details regarding the process 600 of FIG. 6 and the process 700 of FIG. 7 may be better understood. For example, the process 600 performed by the algorithm may be set forth in further detail by the following mathematical pseudocode indicative of the portion of the algorithm set forth by process 600, which is an exponential algorithm in the present embodiment. That is, it is to be understood that all of or certain portions of the process 600 of FIG. 6 may be performed according to all or a portion of the following pseudocode. For example, let A[ ][ ] be a 2-dimensional array indexed both by destination j in $\{1, 2, \ldots, n-1\}$ and by subset S of $\{0, 1, 2, \ldots, n-1\}$ that contains node 0 to track the lowest-cost route starting from 0, visiting every location in S exactly once, and ending at node j. A base case may therefore be set forth by equation (1):

$$A[j][\{0,j\}] = C_{0j} \text{ for } j > 0 \tag{1}$$

Further, a nested loop provided by pseudocode set (2) enables calculation of a minimum travel cost for a route via equation (3):

For $m = 3, 4, \ldots, n,$ (2)

For each set S of size m that contains node 0,
For each j in S that is not 0,
$\quad$ AW[S]=min{A[k][S−{j}]+$C_{kj}$} over each k in S that is not j nor 0

Minimum travel cost=min{$A[j][\{0,1,2,\ldots,n-1\}]$+$C_{j0}$} over $j>0$ (3)

To facilitate further understanding of the process 600 in view of equation (1), pseudocode set (2), and equation (3), a non-limiting example embodiment of a set of assigned tasks 504 for an agent including three tasks is described herein. As noted herein, variables or values contained in braces such as "{}" are sets (e.g., unordered collections) and variables or values contained in brackets such as "[]" are tuples (e.g., ordered combinations). The agent in this example is at a start location separate from the three tasks and is to arrive back at the start location after completion of the three tasks. That is, the end location is the start location. Equation (1), pseudocode set (2), and equation (3) may therefore be implemented with a matrix C that defines the three tasks locations and the origin (e.g., starting node), as set forth by equation (4):

$$C = \begin{bmatrix} 0 & 1 & 15 & 6 \\ 2 & 0 & 7 & 3 \\ 9 & 6 & 0 & 12 \\ 10 & 4 & 8 & 0 \end{bmatrix} \tag{4}$$

From matrix C, subsets of size 3 are {0, 1, 2}, {0, 1, 3}, {0, 2, 3}, and a subset of size 4 is {0, 1, 2, 3}. The base case, which is the distance from the end location (e.g., node 0) to every other node (e.g., each task of the assigned tasks 504), is therefore provided by equation set (5):

$$A[1][\{0,1\}] = C_{01} = 1$$

$$A[2][\{0,2\}] = C_{02} = 15$$

$$A[3][\{0,3\}] = C_{03} = 6 \tag{5}$$

Looping through the pseudocode set (2) for m equal to three therefore gives equation set (6), into which a respective base case may be incorporated to provide the respective travel distance from the starting node, to a first node, and then to a second node:

$$A[1][\{0,1,2\}] = A[2][\{0,2\}] + C_{21} = 15 + 6 = 21$$

$$A[2][\{0,1,2\}] = A[1][\{0,1\}] + C_{12} = 1 + 7 = 8$$

$$A[1][\{0,1,3\}] = A[3][\{0,3\}] + C_{31} = 6 + 4 = 10$$

$$A[3][\{0,1,3\}] = A[1][\{0,1\}] + C_{13} = 1 + 3 = 4$$

$$A[2][\{0,2,3\}] = A[3][\{0,3\}] + C_{32} = 6 + 8 = 14$$

$$A[3][\{0,2,3\}] = A[2][\{0,2\}] + C_{23} = 15 + 12 = 27 \tag{6}$$

That is, the first equation of equation set (6) provides the distance for traveling from the starting node, to the second task, and to the first task, the second equation of equation set (6) provides the distance for traveling from the starting node, the first task, and the second task, the third equation of equation set (6) provides the distance for traveling from the starting node, the third task, and the second task, and so forth. These steps generally correspond to the blocks 624 and 626 of the process 600.

Then, with m incremented to 4 (e.g., corresponding to block 630 of process 600), and with the respective entries from equation set (6) inserted into the pseudocode set (3), equation set (7) provides the travel distances between subsets of three nodes of the set of assigned tasks 504:

$$A[1][\{0,1,2,3\}] = \min\{A[2][\{0,2,3\}] + C_{21}, A[3][\{0,2,3\}] + C_{31}\} = \min\{14+6, 27+4\} = 20$$

$$A[2][\{0,1,2,3\}] = \min\{A[1][\{0,1,3\}] + C_{12}, A[3][\{0,1,3\}] + C_{32}\} = \min\{10+7, 4+8\} = 12$$

$$A[3][\{0,1,2,3\}] = \min\{A[2][\{0,1,2\}] + C_{23}, A[1][\{0,1,2\}] + C_{13}\} = \min\{8+12, 21+3\} = 20 \tag{7}$$

The route is then connected back to the starting node 0 according to blocks 716 and 722 of process 700 by implementing equation (8):

$$\min\{A[1][\{0,1,2,3\}] + C_{10}, A[2]\{0,1,2,3\} + C_{20}, A[3][\{0,1,2,3\}] + C_{30}\} = \min\{20+2, 12+9, 20+10\} = 21 \tag{8}$$

Then, the algorithm traces back through the previous determinations to identify the lowest cost permutation of each subset, corresponding to block 732 of process 700. For example, the minimum cost of 21 comes from A[2][{0, 1, 2, 3}]+$C_{20}$, A[2][{0, 1, 2, 3}] comes from A[3][{0, 1, 3}]+$C_{32}$, and A[3][{0, 1, 3}] comes from A[1][{0, 1}], which yields 0←2←3←1←0. Reversing the order of this result according to block 736 of process 700 therefore gives the acceptable or intermediate route 740 of [0, 1, 3, 2, 0]. Although discussed herein with reference to initially formulating the intermediate route 740 in reverse and the reversing the intermediate route 740, it is to be understood that the preceding determinations may be performed in any suitable alternative manner such as by formulating the intermediate route initially in the forward direction and omitting block 736 of FIG. 7. Further, although the steps of process 700 may be computationally expensive with a time complexity of $n^2 2^n$, where n represents the number of tasks scheduled by the process 700, the intermediate route 740 generated by the process 700 is a non-approximated, optimal route with the lowest travel cost for the given set of conditions associated with the assigned tasks 504, benefiting the agent, the enterprise, and the clients by enabling the agent to efficiently travel between tasks requested by the client.

With the above understanding of suitable routing of assigned tasks 504 without time constraints, further discussion is now provided regarding routing of assigned tasks 504 with time constraints or time windows. For example, if at block 520 of FIG. 5, the algorithm determines the assigned tasks 504 are associated with time windows, the algorithm determines (block 550) whether to use a timed intermediate algorithm instead of a complex timed intermediate algorithm, each of which are described in detail below. For example, in some embodiments, the algorithm may use the timed intermediate algorithm if the number of assigned tasks 504 is above a secondary threshold number of assigned tasks (lower than the threshold number of assigned tasks of block 506), if a threshold number of the assigned tasks 504 do not include time specifications, if an average time window for the assigned tasks 504 is above a threshold time window duration, or so forth. In response to determining that use of the timed intermediate algorithm is appropriate, the algorithm proceeds to execute (block 552) a sub-level process set forth by FIG. 8. Alternatively, in response to determining that use of the timed intermediate algorithm is not appropriate, the algorithm may alternatively proceed directly to block 562, as discussed later.

Figure 8:
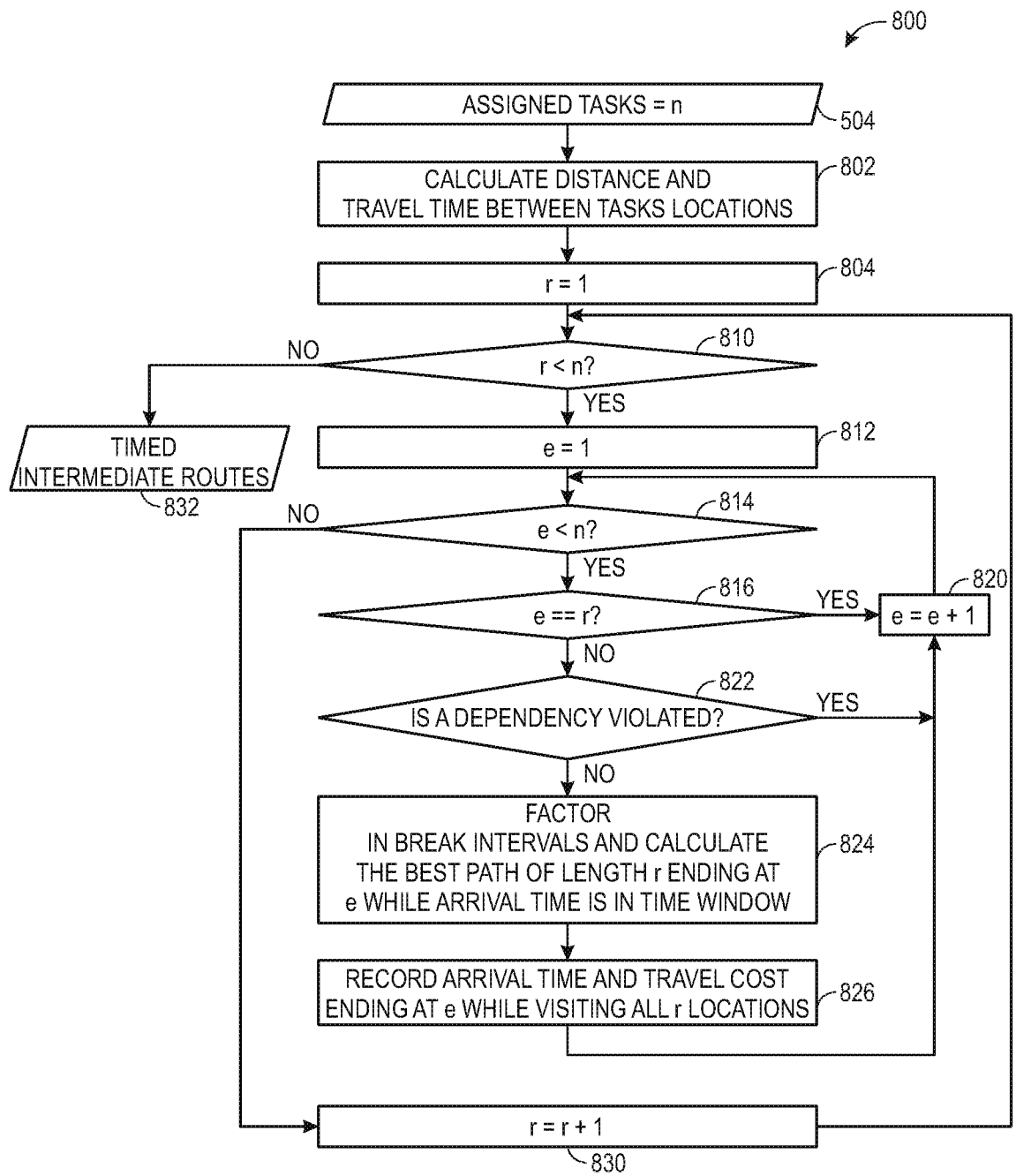
FIG. 8 is a flow diagram of an embodiment of a sub-level process for generating all suitable routes with a pair of lowest cost and arrival time between tasks with time constraints, in accordance with aspects of the present disclosure.

Looking now to FIG. 8, FIG. 8 is a flow chart of an embodiment of a process 800 (e.g., sub-level process) to be implemented by the algorithm for generating all suitable routes with a pair of lowest cost and arrival time between assigned tasks 504 with time windows, in accordance with aspects of the present disclosure. The steps illustrated in the process 800 are meant to facilitate discussion and are not intended to limit the scope of this disclosure, because additional steps may be performed, certain steps may be omitted, and the illustrated steps may be performed in an alternative order or in parallel, where appropriate.

Particularly, the process 800 of FIG. 8 corresponds to the process 600 of FIG. 6, with three notable differences described below. For brevity, detailed discussion of blocks 802, 804, 810, 812, 814, 816, 820, 822, and 830 is not provided herein, as corresponding descriptions may be understood with reference to blocks 602, 604, 610, 612, 614, 616, 620, 622, and 630 of FIG. 6, respectively. Distinct from the process 600 of FIG. 6, it should be recognized that the assigned tasks 504 analyzed by the algorithm performing process 800 include an additional dimension representative of their corresponding time constraints, such that the subsequent steps of the process 800 are performed with consideration of the additional dimension. As such, block 810, which generally corresponds to block 610 of FIG. 6, outputs one or multiple timed intermediate routes 832 that route the agent between the assigned tasks 504 in line with the corresponding time constraints.

As a further illustration of the inclusion of a dimension for tracking arrival time, both blocks 824 and 826 of the process 800 are more complex than the corresponding blocks 624 and 626 of FIG. 6, and thus, set forth the remaining two notable deviations from process 600 of FIG. 6. For example, after determining at block 822 that a dependency is not violated, the algorithm following the process 800 factors (block 824) in break intervals while calculating a lowest cost path of length r ending at e while the arrival time is in a corresponding time window. Then, the algorithm records (block 826) the arrival time and travel cost for ending at e while visiting all r locations. As such, after the algorithm progresses through the remainder of the process 800, the timed intermediate routes 832 are output. Although the timed intermediate routes 832 are denoted as intermediate in view of additional processing steps that may be performed by the process 500 of FIG. 5, it is to be understood that the timed intermediate routes 832, or a lowest-cost route(s) thereof, may instead be considered final, suitable routes that are provided to the agent, in some embodiments.

With the timed intermediate routes 832 determined, the algorithm may return to process 500 of FIG. 5 for further evaluation of the timed intermediate routes 832. That is, with reference to FIG. 5, the algorithm may determine (block 560) whether at least one of the timed intermediate routes 832 include all assigned tasks 504. In response to determining that all assigned tasks are included in at least one of the timed intermediate routes 832, that is, no time constraints were violated by the calculations of FIG. 8, the algorithm may proceed to output the-lowest cost route of the timed intermediate routes 832 as a timed acceptable route 516. Then, the algorithm factors (block 518) in break intervals for the agent to set a travel start time, arrival time, travel duration, and end time for the assigned tasks 504 on the timed acceptable route 510, which is provided to the agent to end (block 514) the process 500, as discussed above.

Figure 9:
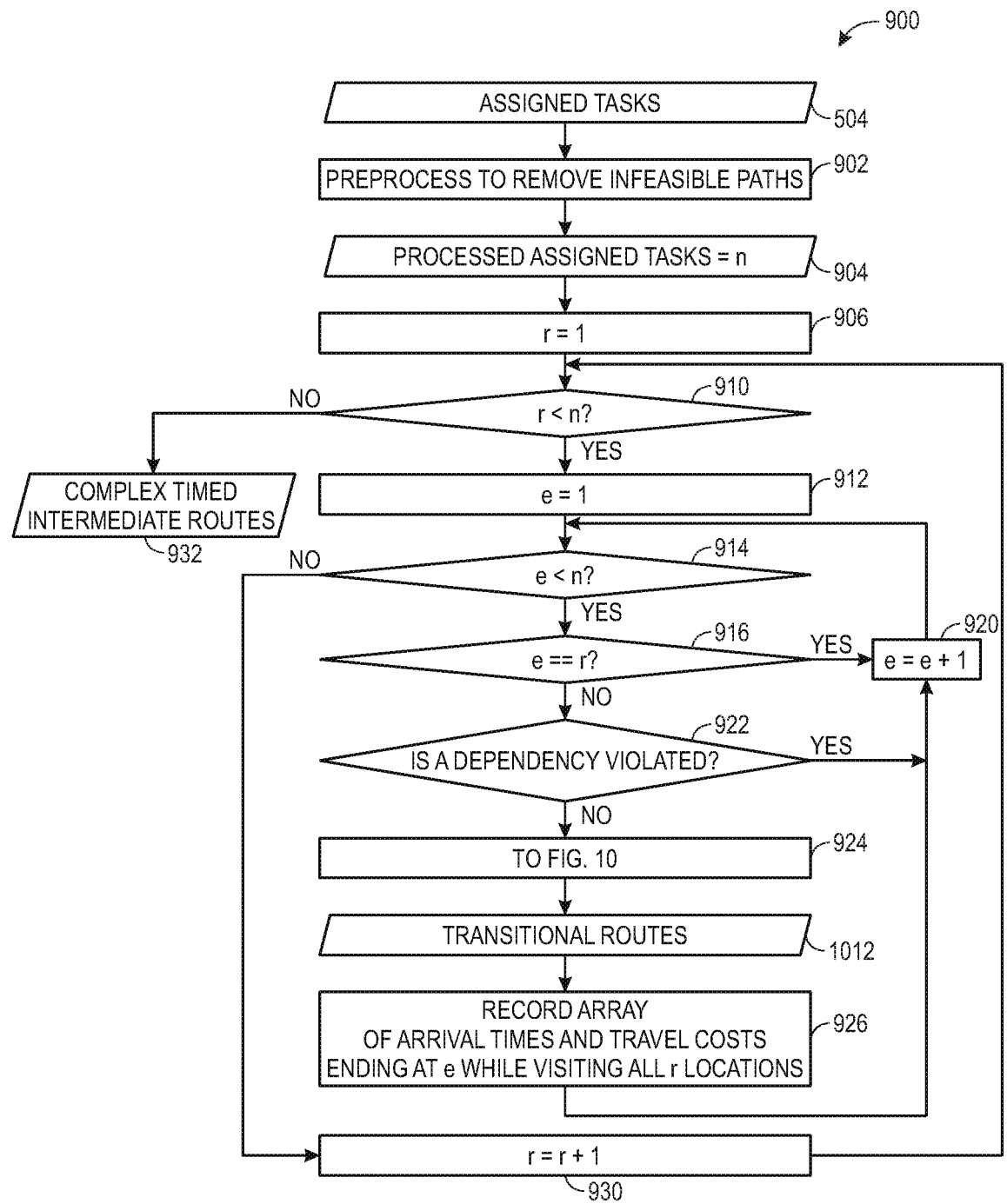
FIG. 9 is a flow diagram of an embodiment of a sub-level process for generating all suitable routes between tasks with time constraints via three-dimensional matrix calculations, in accordance with aspects of the present disclosure.

Alternatively, in response to determining that one or more of the assigned tasks 504 were not scheduled within the timed intermediate routes 832, the algorithm following the process 500 proceeds to execute (block 562) a sub-level process set forth by FIG. 9 to perform more in-depth, time-conscious determinations. That is, turning now to FIG. 9, FIG. 9 is a flow chart of an embodiment of a process 900 (e.g., sub-level process) to be implemented by the algorithm for generating all suitable routes between tasks with time windows, in accordance with aspects of the present disclosure. The steps illustrated in the process 900 are meant to facilitate discussion and are not intended to limit the scope of this disclosure, because additional steps may be performed, certain steps may be omitted, and the illustrated steps may be performed in an alternative order or in parallel, where appropriate.

With the assigned tasks 504 as input, the algorithm following the process 900 may preprocess (block 902) the assigned tasks 504 to identify and remove or exclude infeasible routes from further consideration. In some embodiments, one or multiple assigned tasks 504 may be identified as outliers or otherwise problematic for routing, and thus be excluded or individually processed by the algorithm. Thus, processed assigned tasks 904 may be generated that do not cause the infeasible routes (e.g., or include assigned tasks 504 that result in infeasible routes), thereby preventing generation of unsatisfactory routes by and/or reducing a number of computations performed in subsequent steps of the process 900. In the illustrated embodiment of process 900, a variable n is set as the total number of locations in the processed assigned tasks 804.

Notably, the following steps of the process 900 of FIG. 9 generally correspond to steps of the process 800 of FIG. 8, with notable differences therebetween described herein. For brevity, detailed discussion of blocks 906, 910, 912, 914, 916, 920, 922, and 930 is not provided herein, as corresponding descriptions may be understood with reference to blocks 804, 810, 812, 814, 816, 820, 822, and 830 of FIG. 8, respectively. As with the assigned tasks 504 analyzed via the process 800 of FIG. 8, the preprocessed assigned tasks 904 include an additional dimension representative of their corresponding time constraints, such that the subsequent steps of the process 900 are performed with consideration of the additional dimension. However, the process 900 may be more computationally expensive than the process 800 of FIG. 8, such that block 910 outputs one or multiple complex timed intermediate routes 932 that efficiently route the agent between the assigned tasks 504 in line with the corresponding time constraints.

Figure 10:
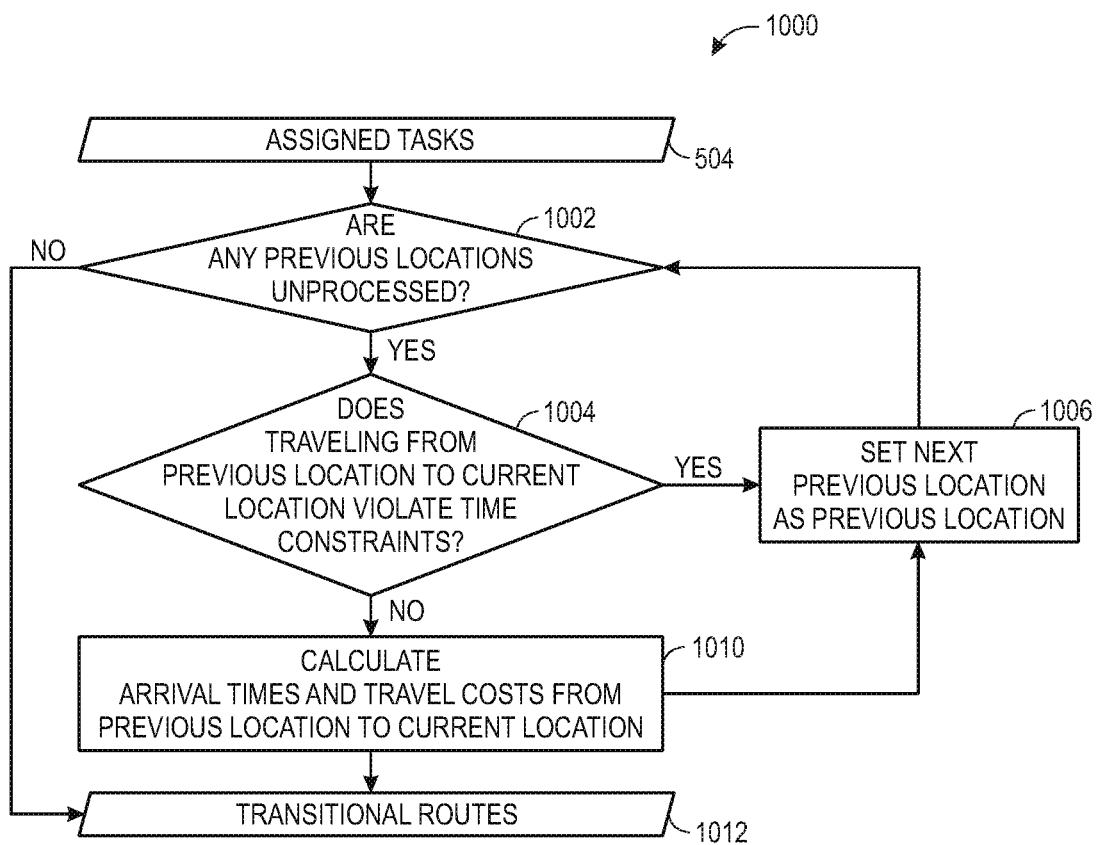
FIG. 10 is a flow diagram of an embodiment of a sub-level process for generating all time-constraint satisfied routes between tasks without dependency violations, in accordance with aspects of the present disclosure.

Moreover, both blocks 924 and 926 are more complex than the generally corresponding blocks 824 and 826 of the process 800. For example, after determining at block 922 that a dependency is not violated, the algorithm following the process 900 executes (block 924) a sub-level process set forth by FIG. 10 for generating routes without dependency violations. Looking now to FIG. 10, FIG. 10 is a flow chart of an embodiment of a process 1000 (e.g., sub-level process) to be implemented by the algorithm for generating all time-constraint satisfied routes between tasks without dependency violations, in accordance with aspects of the present disclosure. The steps illustrated in the process 1000 are meant to facilitate discussion and are not intended to limit the scope of this disclosure, because additional steps may be performed, certain steps may be omitted, and the illustrated steps may be performed in an alternative order or in parallel, where appropriate Based on the assigned tasks 504, the algorithm following process 1000 determines (block 1002) whether any previous locations in the assigned tasks 504 are unprocessed. In response to determining that at least one location is unprocessed, the algorithm determines (block 1004) whether traveling from a previous location to the current location violates time constraints. In response to determining that a time constraint is violated, the algorithm sets (block 1006) a next previous location to be the previous location and returns to block 1002. In some embodiments, the location that violated time constraints is also flagged or stored for future reference. In response to determining that a time constraint is not violated, the algorithm calculates (block 1010) arrival times and travel costs from the previous location to the current location, such as by a similar manner to the manner discussed above with reference to block 824 of process 800 of FIG. 8. Then, the algorithm sets (block 1006) a next previous location to be the previous location and returns to block 1002. The process 1000 continues this loop until all locations within the assigned tasks 504 are processed. Once the algorithm determines at block 1002 that there are no more unprocessed previous locations, the process 1000 outputs transitional routes 1012. In the present embodiment of the process 1000, the transitional routes 1012 are returned to the process 900 of FIG. 9 for further evaluation.

Then, with reference back to FIG. 9, the algorithm records (block 926) an array of the arrival times and travel costs for the identified transitional routes 1012 ending at e while visiting all r locations. As such, after the algorithm progresses through the remainder of the process 900, the complex timed intermediate routes 932 are output. Although the complex timed intermediate routes 932 are denoted as intermediate in view of additional processing steps that may be performed by the process 500 of FIG. 5, it is to be understood that the complex timed intermediate routes 932, or a lowest-cost route(s) thereof, may instead be considered final, suitable routes that are provided to the agent, in some embodiments.

The processes 900 and 1000 performed by the algorithm may be set forth in further detail by the following time-complex recurrence equation indicative of the algorithm. With time windows included in the assigned tasks 504, a third dimension is included in the algorithm to track an arrival time of the agent at each of the assigned tasks 504. For example, let A[ ][ ][ ] be a three-dimensional array indexed by destination j and subset S of locations and arrival time t. To track the lowest cost or a suitably low cost of a route in which the agent starts at start location 0, visits every location in S exactly once, and ends at destination j within S ready to perform a respective task at destination j at time t or later, a recurrence equation is performed by the algorithm for determining the complex timed intermediate route 932. In particular, the recurrence equation is provided by equation (9):

$$A[j][S][t] = \min_{(i,j) \in E} \langle A[i][S - \{j\}][t'] + C_{ij}\rangle, \text{ where } \ldots \quad (9)$$

$$a_i \le t' \le b_i, a_j \le t \le b_j, \text{ and } t' + s_j + t_{ij} \le t$$

With the complex timed intermediate route 932 determined, the algorithm may return to process 500 of FIG. 5 for further evaluation of the complex timed intermediate route 932. That is, with reference now to FIG. 5, the algorithm may determine (block 570) whether at least one of the complex timed intermediate routes 932 is valid. In response to determining that at least one of the complex timed intermediate routes 932 is valid, the algorithm may output a lowest-cost one of the complex timed intermediate routes 932 as the timed acceptable route 516 to end (block 514) the process 500, as discussed above. Alternatively, if the process 900 of FIG. 9 does not provide at least one complex timed intermediate route 932 that meets suitable criteria (e.g., a priority level of each assigned task 504 and/or a task dependency of each assigned task 504), the algorithm may determine that the complex timed intermediate routes 932 are not valid. In response to determining that the complex timed intermediate route 932 are not valid, the algorithm proceeds to execute (block 572) a sub-level process set forth by FIG. 11 to generate a new complex timed intermediate route 932 between the subset of the assigned tasks 504.

Figure 11:
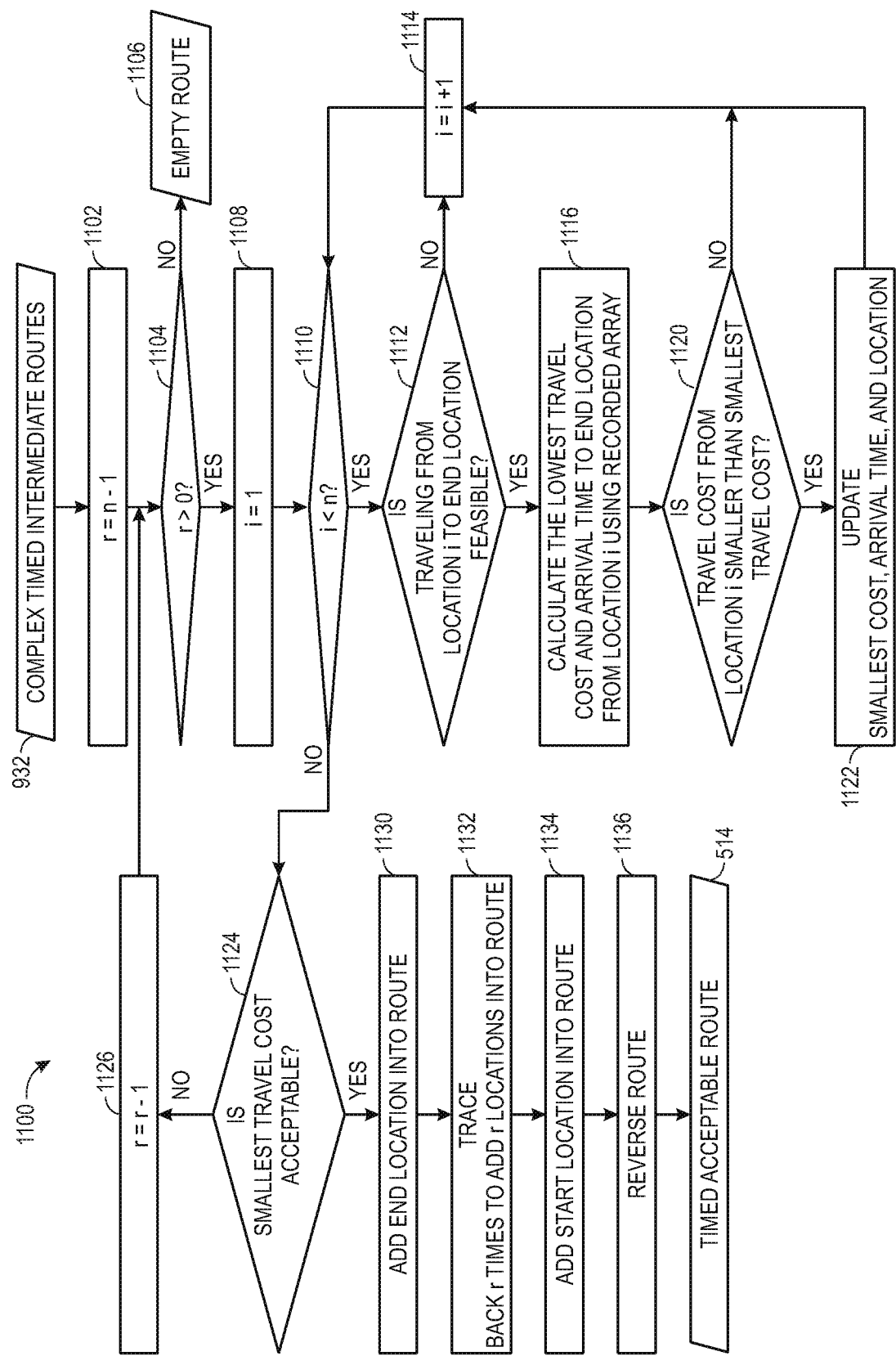
FIG. 11 is a flow diagram of an embodiment of a sub-level process for generating a suitable route between a subset of tasks with time constraints, in accordance with aspects of the present disclosure.
Figure 12:
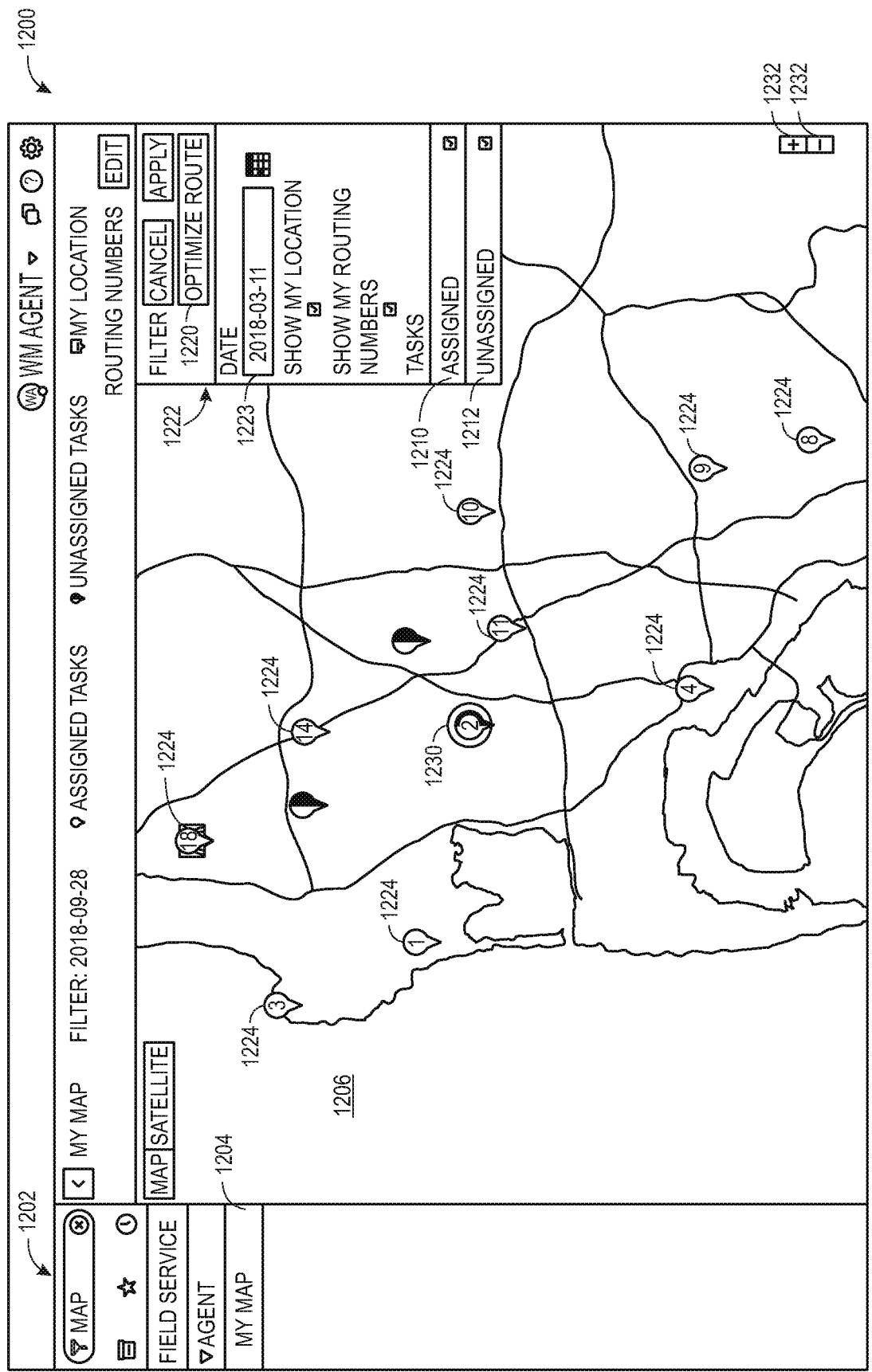
FIG. 12 is a screenshot of an embodiment of a user interface for accessing a suitable route generated by a routing algorithm, in accordance with aspects of the present disclosure.
Figure 13:
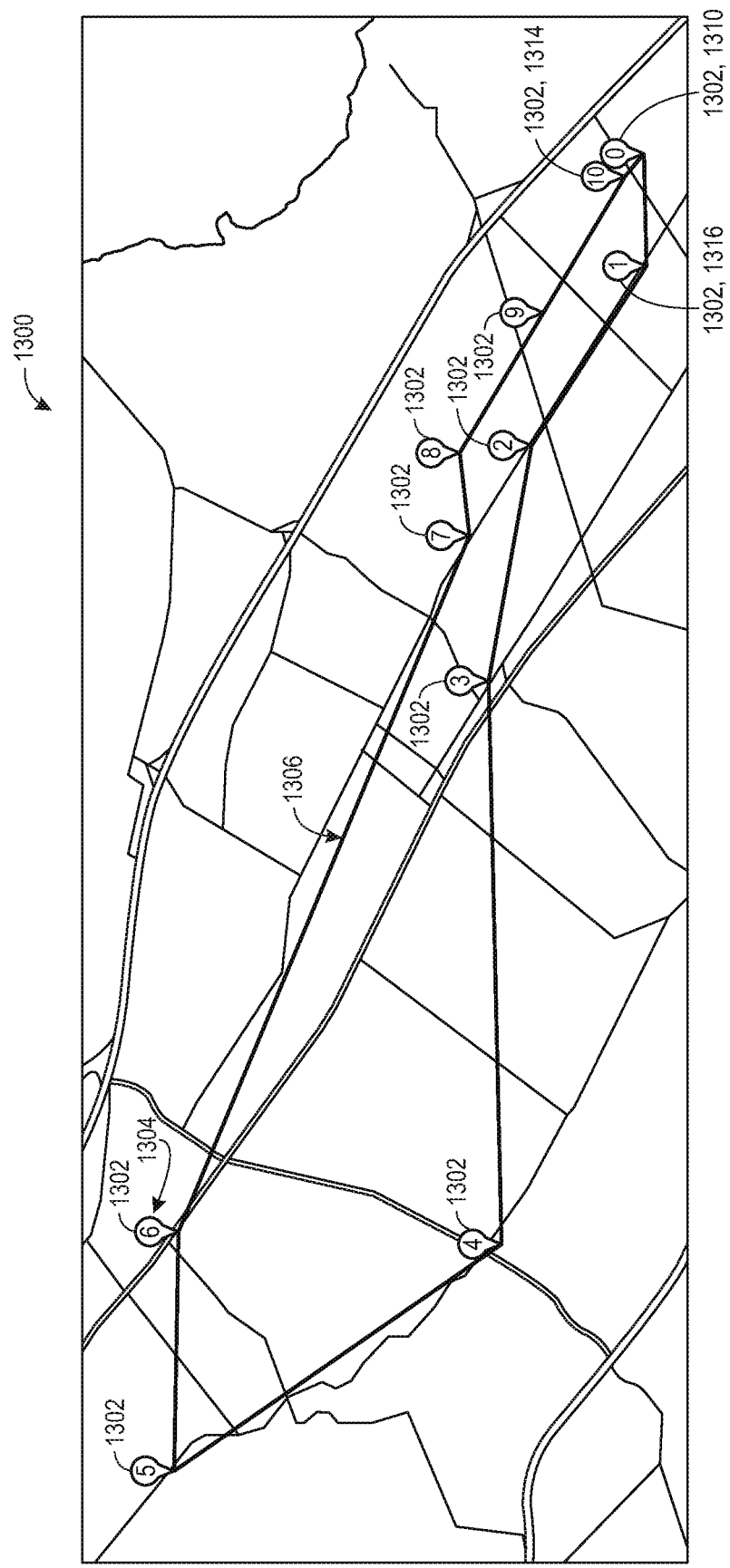
FIG. 13 is a screenshot of an embodiment of a suitable route generated by a routing algorithm, in accordance with aspects of the present disclosure.

Looking now to FIG. 11, FIG. 11 is a flow chart of an embodiment of a process 1100 (e.g., sub-level process) to be implemented by the algorithm for generating a suitable route between a subset of tasks with time constraints, in accordance with aspects of the present disclosure. The steps illustrated in the process 1100 are meant to facilitate discussion and are not intended to limit the scope of this disclosure, because additional steps may be performed, certain steps may be omitted, and the illustrated steps may be performed in an alternative order or in parallel, where appropriate. Based on the complex timed intermediate routes 932 generated by the process 900 of FIG. 9, the variable n is set as the total number of locations in the assigned tasks 504 associated with the complex timed intermediate routes 932.

Moreover, certain subsequent steps of the process 1100 of FIG. 11 generally correspond to steps of the process 700 of FIG. 7, with notable differences therebetween described herein. As such, for brevity, detailed discussion of blocks 1102, 1104, 1106, 1108, 1110, 1112, 1114, 1120, 1124, 1126, 1130, 1132, 1134, and 1136 is not provided herein, as corresponding descriptions may be understood with reference to blocks 702, 704, 706, 708, 710, 712, 714, 720, 724, 726, 730, 732, 734, and 736 of FIG. 7, respectively. As with the assigned tasks 504 analyzed via the process 900 of FIG. 9, the assigned tasks 504 of the complex timed intermediate routes 932 include the additional dimension representative of their corresponding time constraints, such that the subsequent steps of the process 900 are performed with consideration of the additional dimension. For example, after determining at block 1112 that traveling from location i to the end location is feasible, the algorithm calculates (block 1116) the lowest travel cost and arrival time to a given end location from location i using a recorded array, thereby keeping track of the time dimension during the process 1100. Then, after determining the travel cost form location i is smaller than a smallest travel cost at block 1120, the algorithm updates *block 1122) the smallest cost, arrival time, and location for a given iteration through the process 1100. After working through the remainder of the process 1100, similar to the progression through the process 700 of FIG. 7, the algorithm outputs the timed acceptable route 516 between a subset of the assigned tasks 504, which is returned to the process 500 of FIG. 5 to end (block 514) the process 500.

To help illustrate steps and components of the algorithm of FIGS. 5-11, FIG. 12 is a screenshot illustrating an example embodiment of a user interface 1200 for accessing the timed acceptable route 516 of an agent, in accordance with aspects of the present disclosure. In some embodiments, the user interface 1200 is a screen that is displayed on a suitable client device 20 after execution of the algorithm of FIGS. 5-11 to generate the timed acceptable route 516.

As shown, the user interface 1200 includes a sidebar 1202 from which the user may select a "My Map" virtual button 1204, which displays a map 1206 or map portion adjacent to the sidebar 1202. The map may be populated with tasks for a particular region associated with the agent, including assigned tasks 1210 and unassigned tasks 1212 (e.g., unnumbered tasks). By selecting an "Optimize Route" virtual button 1220 on an interaction window 1222 overlaid onto a portion of the map 1206, the agent may request generation of a route between geographic locations associated with the assigned tasks 1212 for the agent to complete within a selected working period 1223. As shown, the assigned tasks 1210 of the timed acceptable route 516 may be displayed to the agent in the form of numbered markers 1224 disposed on the map 1206, each in a position corresponding to an actual physical location of a respective assigned task. For situations in which multiple tasks are geographically close together (e.g., within a respective threshold distance from one another for a given scale of the map 1206), an aggregate marker 1230 may be displayed in an average location of the multiple tasks. In the illustrated embodiment, the aggregate marker 1230 is larger than the numbered markers 1224 and includes a number indicating the quantity of numbered markers 1224 replaced by the aggregate marker 1230. In some embodiments, the agent may interact with zoom virtual buttons 1232 on the map 1206 to change a scale of the map 1206. By decreasing the scale of the map (e.g., zooming in), the aggregate markers 1230 may be broken into their corresponding numbered markers 1224. By increasing the scale of the map (e.g., zooming out), certain numbered markers 1224 that are within the respective threshold distance from one another may be combined into a corresponding aggregate marker 1230.

Further, in some embodiments, the timed acceptable route 516 is generated on a periodic or scheduled basis, such as at a particular time before the next working period of the agent (e.g., midnight, 6 am, 1 hour before the working period). In these embodiments, the agent may access the user interface 1200 to view the assigned tasks 1210 of the previously-generated timed acceptable route 516, without necessarily requesting specific generation of the timed acceptable route 516. The agent may also select the "Optimize Route" virtual button 1220 at any desired time, such as after completion of a first assigned task for the workday or a time period, to instruct the algorithm to generate a new timed acceptable route 516 that is updated in view of current traffic conditions. In further embodiments, after an unassigned task 1212 is assigned to the agent, the algorithm automatically determines and illustrates a new timed acceptable route 516.

As further illustration of the steps and components of the algorithm of FIGS. 5-11, FIG. 13 is a screenshot of an embodiment of an acceptable route 1300 generated by the algorithm, in accordance with aspects of the present disclosure. The acceptable route 1300 of the illustrated embodiment includes ten assigned tasks 1302 for the agent to complete, each indicated by a numbered marker 1304. A route path 1306 is provided by the algorithm and illustrated as sequentially connecting the assigned tasks 1302 into a loop. That is, for the illustrated embodiment, the agent is positioned at a "0" numbered marker 1310, which may correspond to a home location, dispatch location, or start location (e.g., route end point) of the agent, and returns to the "0" numbered marker 1310 at the end of the agent's work period, which corresponds to an end location (e.g., route end point) of the agent. The route path 1306 is a straight line estimate in the present embodiment that linearly connects sequentially-scheduled assigned tasks 1302, although it is to be understood that the algorithm may alternatively provide a route path that aligns with roads and other infrastructures in some embodiments.

Notably, the route path 1306 does not intersect or cross over itself, illustrating an efficiency of the routing of the assigned tasks 1302 provided by the algorithm disclosed herein. However, in other embodiments, such as when a relatively far away task has the earliest time window, highest priority, or so forth, the route path 1306 generated by the algorithm may intersect itself to enable the relatively far away task to be completed in line with its corresponding restrictions. Additionally, although a "10" numbered marker 1314 (e.g., corresponding to a tenth task) is closer to the "0" numbered marker 1310 than a "1" numbered marker 1316 (e.g., corresponding to a first task), the algorithm determined that first traveling the longer distance to the "1" numbered marker 1316 provided a more efficient or suitable embodiment of the route path 1306 than first traveling to the "10" numbered marker 1314. As such, the threshold number of tasks for the algorithm may have been set to eleven tasks or higher so that the algorithm generated the acceptable route 1300 via one or multiple of the processes of FIGS. 6-11, instead of by the sequence of U.S. Pat. No. 9,911,087. In some embodiments, a direction (e.g., clockwise, counter-clockwise) through the assigned tasks 1302 may be determined based on task dependency, time windows, and/or task priority. For example, the first task associated with the "1" numbered marker 1316 may have an earlier time window and/or a higher priority than the tenth task associated with the "10" numbered marker 1314, causing the algorithm to sequence the first task for earlier completion than the tenth task.

As discussed herein, efficiently routing an agent between a plurality of assigned tasks is a complication-heavy endeavor that may be proficiently performed by a routing algorithm. The algorithm may consider multiple factors when routing the assigned tasks within the acceptable or aggregate route, such as location of the task, a time window or time constraints for the task, a priority level of the task, and/or a task dependency of the task. Generally, the algorithm determines a travel cost for traveling from an end location to each of the assigned tasks. Then, the algorithm determines a travel cost for each permutation of traveling from the end location, to a first assigned task, and to a second assigned task, identifying a subset having the lowest cost. Continuing to increment the number of assigned tasks included in each subset, calculating a travel cost for each subset, and identifying the lowest-cost subset therein, the algorithm is then able to work or trace back through the identified subsets to construct the lowest-cost route from the end location, to each task, and to the start location. Then, the algorithm may reverse the order of the assigned tasks to output an acceptable or comprehensive route from a start location, visiting each assigned task in line with its corresponding restrictions, and to an end location. In embodiments in which a number of tasks is greater than a threshold number of tasks that are set for the algorithm, the algorithm may alternatively perform an approximation sequence to generate a suitable route, with a reduced use of processing resources compared to use of the processing resources by aspects of the algorithm performed when the number of tasks is less than the threshold number of tasks.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A method, comprising:
receiving data indicative of a set of assigned tasks for an agent to complete during a time period;
determining a travel cost from a route end point of the agent to each assigned task of the set of assigned tasks;
determining a travel cost for each permutation of a first subset of the set of assigned tasks to identify a permutation of the first subset having a lowest travel cost;
determining a travel cost for each permutation of a second subset of the set of the assigned tasks to identify a permutation of the second subset having a lowest travel cost, wherein the second subset includes a greater number of assigned tasks than the first subset;
determining, based on the data, whether the set of assigned tasks is associated with time windows;
determining a route based on the identified permutation of the second subset, wherein the route is determined using three-dimensional matrix calculations in response to determining that the set of assigned tasks is associated with time windows, and wherein the route is determined using two-dimensional matrix calculations in response to determining that the set of assigned tasks is not associated with time windows; and
providing the route to a client device associated with the agent, wherein the client device is configured to present the route to the agent.

2. The method of claim 1, comprising:
determining a travel cost for each permutation of each possible incremental subset of the set of assigned tasks to identify a permutation of each possible incremental subset having a lowest travel cost; and
determining the route based on the identified permutation of each possible incremental subset.

3. The method of claim 1, wherein the route end point is an end location of the agent, and wherein the route is determined based on the identified permutation of the second subset by scheduling each assigned task of the identified permutation of the second subset within the route in a reversed order.

4. The method of claim 1, comprising:
determining, based on the data, whether the set of assigned tasks includes more than a threshold number of assigned tasks; and
in response to determining that the set of assigned tasks includes more than the threshold number of assigned tasks, determining the route by:
scheduling a first assigned task that has a lowest travel cost from a start location as first in the route; and
scheduling a second assigned task that has a lowest travel cost from the first assigned task as second in the route.

5. The method of claim 1, comprising:
in response to determining that the set of assigned tasks is not associated with time windows, determining the route according to a nested loop and a minimum travel cost equation, respectively:
for m=3, 4, . . . , n,
for each set S of size m that contains node 0,
for each j in S that is not 0:
$A[j][S]=\min\{A[k][S-\{j\}]+C_{kj}\}$ over each iterative index k in S that is not j nor 0; and
Minimum travel cost=$\min\{A[j][\{0, 1, 2, \ldots, n-1\}]+C_{j0}\}$ over j>0;
wherein n is a number of assigned tasks included in the set of assigned tasks, A[ ][ ] is a 2-dimensional array indexed by destination j in $\{1, 2, \ldots, n-1\}$ and by subset S of $\{0, 1, 2, \ldots, n-1\}$ that contains node 0, $C_{kj}$ is a cost associated traveling between k and j, and wherein the nested loop tracks a respective lowest-cost route starting from 0, visiting every location in S exactly once, and ending at node 0.

6. The method of claim 1, comprising:
in response to determining that the set of assigned tasks is associated with time windows, determining the route according to a recurrence equation:

$$A[j][S][t] = \min_{(i,\, j)\, \in\, E} \langle A[i-\{j\}][t'] + C_{ij}\rangle \text{ where}$$

$a_i \le t' \le b_i$, $a_j \le t \le b_j$, and $t' + S_j + t_{ij} \le t$;

wherein n is a number of assigned tasks included in the set of assigned tasks, A[ ][ ][ ] is a three-dimensional array indexed by destination j, subset S of locations and arrival time t, $C_{ij}$ is a cost associated traveling between k and j, and wherein the recurrence equation tracks the least cost of a respective route starting at start location 0, visiting every location in S exactly once, and ending at destination j within S ready to serve at destination j at time t or later.

7. The method of claim 1, comprising:
determining whether the route is valid according to a set of conditions associated with the set of assigned tasks; and
in response to determining the route is not valid, determining a different route based on the subset of the set of assigned tasks.

8. The method of claim 1, comprising determining a respective travel cost by:
transmitting a call to a third-party application programming interface (API) for the respective travel cost; and
receiving the respective travel cost from the third-party API.

9. The method of claim 1, wherein the data indicative of the set of assigned tasks comprises data indicative of an availability of a customer associated with a task of the set of assigned tasks, locations of the set of assigned tasks, dependencies of the set of assigned tasks, or a combination thereof.

10. A system, comprising:
one or more remote client networks comprising one or more client devices;
a client instance hosted by one or more data centers, wherein the client instance is accessible by the one or more remote client networks, wherein the system is configured to employ a routing algorithm to perform operations comprising:
receiving, via the client instance, data indicative of a set of assigned tasks for an agent to complete during a time period;
identifying each possible incremental subset of the set of assigned tasks by incrementing from a base subset comprising a route end point of the agent and one assigned task of the set of assigned tasks to a full subset comprising the route end point and more than one assigned task of the set of assigned tasks;
determining a travel cost for each permutation of each possible incremental subset to identify a permutation of each possible incremental subset having a lowest travel cost;
determining, based on the data, whether the set of assigned tasks is associated with time windows;
determining a route based on the identified permutation of each possible incremental subset, wherein the route is determined using three-dimensional matrix calculations when the set of assigned tasks is determined to be associated with time windows, and wherein the route is determined using two-dimensional matrix calculations when the set of assigned tasks is determined to not be associated with time windows.

11. The system of claim 10, wherein the system is configured to employ the routing algorithm to perform operations comprising providing the route to the agent via the client instance.

12. The system of claim 10, wherein the system is configured to employ the routing algorithm to perform operations comprising:
after determining the route, receiving data indicative of a new assigned task for the agent; and
in response to receiving the data indicative of the new assigned task, updating the route to include the new assigned task.

13. The system of claim 10, wherein the system is configured to employ a routing algorithm to perform operations comprising:
determining whether one or more permutations of each permutation of each possible incremental subset violates one or more conditions associated with the set of assigned tasks; and
in response to determining that at least one permutation of each permutation of each possible incremental subsets violates the one or more conditions, excluding the at least one permutation from travel cost determinations.

14. The system of claim 13, wherein the one or more conditions comprise an availability of a customer associated with a task of the set of assigned tasks, dependencies of the set of assigned tasks, priorities of the set of assigned tasks, or a combination thereof.

15. The system of claim 10, wherein the system is configured to employ the routing algorithm to perform operations comprising:
in response to determining that the set of assigned tasks is not associated with time windows, determining the route according to a nested loop and a minimum travel cost equation, respectively:

for m=3, 4, . . . , n,
for each set S of size m that contains node 0,
for each j in S that is not 0:
$A[j][S] = \min\{A[k][S-\{j\}] + C_{kj}\}$ over each iterative index k in S that is not j nor 0; and
Minimum travel cost $= \min\{A[j][\{0, 1, 2, \ldots, n-1\}] + C_{j0}\}$ over j>0;
wherein n is a number of assigned tasks included in the set of assigned tasks, A[ ][ ] is a 2-dimensional array indexed by destination j in $\{1, 2, \ldots, n-1\}$ and by subset S of $\{0, 1, 2, \ldots, n-1\}$ that contains node 0, $C_{kj}$ is a cost associated traveling between k and j, and wherein the nested loop tracks a respective lowest-cost route starting from node 0, visiting every location in S exactly once, and ending at node 0; and
in response to determining that the set of assigned tasks is associated with time windows, determining the route according to a recurrence equation:

$$A[j][S][t] = \min_{(i,j) \in E} \langle A[i-\{j\}][t'] + C_{ij} \rangle \text{ where}$$

$a_i \leq t' \leq b_i$, $a_j \leq t \leq b_j$, and $t' + S_j + t_{ij} \leq t$;

wherein n is a number of assigned tasks included in the set of assigned tasks, A[ ][ ][ ] is a three-dimensional array indexed by destination j, subset S of locations and arrival time t, $C_{ij}$ is a cost associated traveling between k and j, and wherein the recurrence equation tracks the least cost of a respective route starting at start location 0, visiting every location in S exactly once, and ending at destination j within S ready to serve at destination j at time t or later.

16. A non-transitory, computer readable medium comprising instructions, wherein the instructions are configured to be executed by a processor to perform operations comprising:
receiving, via a client instance, data indicative of a set of assigned tasks for an agent;
providing the data indicative of the set of assigned tasks as input to a routing algorithm, wherein the routing algorithm is configured to:
determining a travel cost from a route end point of the agent to each assigned task of the set of assigned tasks;
determining a travel cost for each permutation of a first subset of the set of assigned tasks to identify a permutation of the first subset having a lowest travel cost;
determining a travel cost for each permutation of a second subset of the set of the assigned tasks to identify a permutation of the second subset having a lowest travel cost, wherein the second subset includes a greater number of assigned tasks than the first subset; and
determining the route based on the identified permutation of the second subset, wherein the ruote is determined using three-dimensional matrix calculations when the set using two-dimensional matrix calculations when the set of assigned tasks is not associated with time windows; and
providing, via the client instance, the route to a client device of the agent, wherein the client device is configured to present the route to the agent.

17. The non-transitory, computer readable medium of claim 16, wherein the routing algorithm is configured to:
- determine whether the route is feasible according to a set of conditions associated with the set of assigned tasks; and
- in response to determining the route is not feasible, determine a new route by decrementing a number of the set of assigned tasks considered by the routing algorithm.

18. The non-transitory, computer readable medium of claim 16, wherein the data indicative of the set of assigned tasks comprises data indicative of an availability of a customer associated with a task of the set of assigned tasks, locations of the set of assigned tasks, dependencies of the set of assigned tasks, or a combination thereof.

19. The non-transitory, computer readable medium of claim 16, wherein the routing algorithm is configured to determine a respective travel cost as a respective travel time or a respective travel distance.

20. The non-transitory, computer readable medium of claim 16, wherein the routing algorithm is configured to:
- in response to determining that the set of assigned tasks is not associated with time windows, determining the route according to a nested loop and a minimum travel cost equation, respectively:

for m=3, 4, ..., n,
   for each set S of size m that contains node 0,
    for each j in S that is not 0:
  $A[j][S]=\min\{A[k][S-\{j\}] +C_{kj}\}$ over each iterative index k in S that is not j nor 0; and Minimum travel cost=$\min\{A[j][\{0, 1, 2, \ldots, n-1\}]+C_{j0}\}$ over j>0;

wherein n is a number of assigned tasks included in the set of assigned tasks, A[ ][ ] is a 2-dimensional array indexed by destination j in {1, 2, ..., n−1} and by subset S of {0, 1, 2, ..., n−1} that contains node 0, $C_{kj}$ is a cost associated traveling between k and j, and wherein the nested loop tracks a respective lowest-cost route starting from node 0, visiting every location in S exactly once, and ending at node 0; and

- in response to determining that the set of assigned tasks is associated with time windows, determining the route according to a recurrence equation:

$$A[j][S][t] = \min_{(i,j) \in E} \langle A[i-\{j\}][t'] + C_{ij}\rangle \text{ where}$$

$$a_i \le t' \le b_i,\ a_j \le t \le b_j,\ \text{and}\ t' + S_j + t_{ij} \le t;$$

wherein n is a number of assigned tasks included in the set of assigned tasks, A[ ][ ][ ] is a three-dimensional array indexed by destination j, subset S of locations and arrival time t, $C_{ij}$ is a cost associated traveling between k and j, and wherein the recurrence equation tracks the least cost of a respective route starting at start location 0, visiting every location in S exactly once, and ending at destination j within S ready to serve at destination j at time t or later.

* * * * *

UNITED STATES PATENT AND TRADEMARK OFFICE
CERTIFICATE OF CORRECTION

PATENT NO. : 11,137,258 B2
APPLICATION NO. : 16/241723
DATED : October 5, 2021
INVENTOR(S) : Xianfa Deng et al.

It is certified that error appears in the above-identified patent and that said Letters Patent is hereby corrected as shown below:

In the Claims

Column 28, Line 5, Claim 15, replace "kin S" with --k in S--.

Column 28, Line 46, Claim 16, replace "determining" with --determine--;
    Line 49, Claim 16, replace "determining" with --determine--;
    Line 53, Claim 16, replace "determining" with --determine--;
    Line 59, Claim 16, replace "determining" with --determine--;
    Line 60, Claim 16, replace "ruote" with --route--;
    Line 62, Claim 16, insert --of assigned tasks is associated with time window, and wherein the route is determined-- between words "set" and "using".

Column 29, Line 30, Claim 20, replace "kin S" with --k in S--.

Signed and Sealed this
Twenty-fifth Day of January, 2022

Drew Hirshfeld
*Performing the Functions and Duties of the*
*Under Secretary of Commerce for Intellectual Property and*
*Director of the United States Patent and Trademark Office*